United States Patent
Tojo et al.

(10) Patent No.: US 8,450,394 B2
(45) Date of Patent: May 28, 2013

(54) INK COMPOSITION FOR INK-JET RECORDING, AND INK-JET RECORDING METHOD

(75) Inventors: Kaoru Tojo, Kanagawa (JP); Yasufumi Ooishi, Kanagawa (JP); Kyohei Mochizuki, Kanagawa (JP); Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 591 days.

(21) Appl. No.: 12/715,458

(22) Filed: Mar. 2, 2010

(65) Prior Publication Data

US 2010/0239759 A1    Sep. 23, 2010

(30) Foreign Application Priority Data

Mar. 19, 2009  (JP) ................. 2009-068822

(51) Int. Cl.
| | | |
|---|---|---|
| B41J 2/01 | (2006.01) | |
| B41J 2/17 | (2006.01) | |
| C08G 73/10 | (2006.01) | |
| C08J 3/00 | (2006.01) | |
| C08K 5/06 | (2006.01) | |
| C09D 5/00 | (2006.01) | |
| C09D 5/02 | (2006.01) | |
| C09D 11/00 | (2006.01) | |
| C09D 11/10 | (2006.01) | |
| G01D 11/00 | (2006.01) | |

(52) U.S. Cl.
USPC ............ 523/160; 347/1; 347/95; 347/100; 347/102; 523/161; 524/366; 524/376; 524/377; 524/378

(58) Field of Classification Search
USPC ............ 523/160, 161; 524/366, 376, 377, 524/378; 347/1, 95, 100, 102
See application file for complete search history.

(56) References Cited

U.S. PATENT DOCUMENTS

| | | | |
|---|---|---|---|
| 5,623,296 A | 4/1997 | Fujino et al. | |
| 2004/0030001 A1 | 2/2004 | Ma et al. | |
| 2004/0110867 A1* | 6/2004 | McCovick | 523/160 |
| 2004/0114013 A1 | 6/2004 | Doi | |
| 2004/0214919 A1* | 10/2004 | Ikeda et al. | 523/160 |
| 2007/0131144 A1 | 6/2007 | Winter et al. | |

FOREIGN PATENT DOCUMENTS

| | | |
|---|---|---|
| EP | 1 493 784 A1 | 1/2005 |
| EP | 2 090 626 A1 | 8/2009 |
| EP | 2 100 930 A1 | 9/2009 |
| EP | 2 165 474 A1 | 9/2009 |
| JP | 2004-59933 A | 2/2004 |
| JP | 2007-145923 A | 6/2007 |
| JP | 2007-246788 A | 9/2007 |
| JP | 2008-200855 A | 9/2008 |
| WO | WO 94/01283 A1 | 1/1994 |

OTHER PUBLICATIONS

Extended European Search Report dated Aug. 5, 2010, issued in corresponding European patent application No. 10002161.7.
Notice of Reasons for Rejection dated Jun. 29, 2010, issued in corresponding Japanese patent application No. 2009-068822 (with English translation).

* cited by examiner

*Primary Examiner* — Patrick Niland
(74) *Attorney, Agent, or Firm* — Birch, Stewart, Kolasch & Birch, LLP

(57) ABSTRACT

An ink composition for ink-jet recording includes a pigment; resin particles having a glass transition temperature of 80° C. or higher; at least one water-soluble organic solvent; and water, and a total mass of solid content in the ink composition for ink-jet recording is 10% by mass or more relative to the ink composition for ink-jet recording, and the at least one water-soluble organic solvent includes at least one organic solvent having an SP value of 27.5 or lower, the amount of the at least one organic solvent having an SP value of 27.5 or lower being 70% by mass or more relative to a total amount of the at least one water-soluble organic solvent. An ink-jet recording method is also provided.

10 Claims, 1 Drawing Sheet

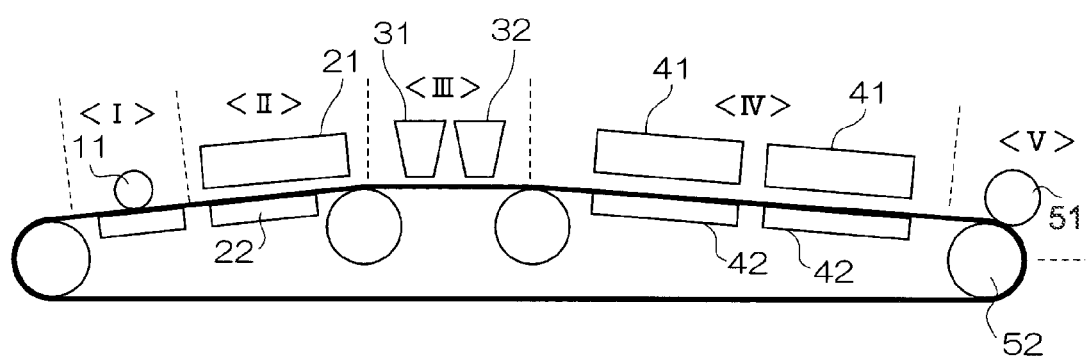

INK COMPOSITION FOR INK-JET RECORDING, AND INK-JET RECORDING METHOD

CROSS-REFERENCE TO RELATED APPLICATION

This Application claims priority under 35 USC 119 from Japanese Patent Application No. 2009-068822 filed on Mar. 19, 2009, the disclosure of which is incorporated by reference herein.

BACKGROUND OF THE INVENTION

1. Technical Field

The present invention relates to an ink composition for use in recording by an ink-jet method, and an ink-jet recording method using the ink composition.

2. Description of the Related Art

Various methods have been proposed for image recording methods for recording color images in recent years. However, in all of these methods, improvements are still demanded with respect to the quality level of recorded objects in relation to, for example, quality of image, texture, and curling properties after recording.

The ink-jet technique has been applied to office printers and household printers, and is recently increasingly being applied in the field of commercial printing. In the commercial printing field, printed sheets are required to have an appearance similar to that of printed sheets obtained by using general printing paper, rather than paper having a surface that completely blocks penetration of ink solvent into the base paper such as that of a photograph. However, when a solvent absorption layer of a recording medium has a thickness of from 20 μm to 30 μm, characteristics such as surface gloss, texture and stiffness are limited. Therefore, the application of ink-jet techniques to commercial printing has been limited to, for example, posters and forms, for which the restrictions on surface gloss, texture, stiffness and the like are tolerable.

Furthermore, a recording medium for exclusive use in ink-jet recording is expensive since it is provided with a solvent absorbing layer and a water resistant layer, and this is also a factor that limits the application of ink-jet technology in the field of commercial printing.

As an ink-jet recording method for forming high quality images, a number of image recording methods in which a liquid composition for improving images is used in addition to a usual ink-jet ink, and the liquid composition is deposited on a recording medium prior to the ejection of the ink-jet ink, have been proposed (see, for example, Japanese Patent Application Laid-Open (JP-A) No. 2004-59933). In this method, the components of the ink-jet ink are aggregated on the surface of paper by the action of a fixing component in the ink, whereby the ink is fixed before dullness or bleeding occurs.

Further, in view of accelerating penetration of an ink solvent into a recording medium, a technique in which a penetration liquid is used for accelerating penetration of the ink solvent into the recording medium and the penetration liquid contains a surfactant, and a technique of fixing an image portion and thereby enhancing the properties of the image portion such as glossiness, are known (see, for example, JP-A No. 2008-200855).

SUMMARY OF THE INVENTION

However, according to the recording methods or techniques described above, when high speed recording is performed using, for example, a single pass method, treatment such as drying or fixation after recording is performed in a short time, which may result in insufficient drying of water, organic solvents, etc., or insufficient penetration thereof into recording media. Then, when another recording medium is disposed on image portions that are still soft, blocking, in which image portions transfer to the rear side of the upper recording medium, is likely to occur.

In a recording system in which a member, such as a roller, contacts images after recording, e.g., when the images are fixed by application of heat and pressure after recording and drying, an offset phenomenon in which the images transfer to the roller or the like to cause roller stain or image defects sometimes occurs.

The present invention has been made in view of the above circumstances, and provides an ink jet recording method.

It has been found that when a latex having a high glass transition temperature is used, the solid content of the ink composition is increased, and when a water-soluble organic solvent having a SP value of 27.5 or lower is used, blocking of images and offset during fixation may be reduced. The present invention has been accomplished based on these findings.

According to a first aspect of the present invention, an ink composition for ink-jet recording is provided. The ink composition for ink-jet recording includes a pigment, resin particles having a glass transition temperature of 80° C. or higher, at least one water-soluble organic solvent, and water. A total mass of solid content in the ink composition for ink-jet recording is 10% by mass or more relative to the ink composition for ink-jet recording, and the at least one water-soluble organic solvent includes at least one organic solvent having an SP value of 27.5 or lower, the amount of the at least one organic solvent having an SP value of 27.5 or lower being 70% by mass or more relative to a total amount of the at least one water-soluble organic solvent.

According to a second aspect of the present invention, an ink-jet recording method is provided. The ink-jet recording method includes ejecting the ink composition for ink-jet recording of the first aspect of the present invention, to record an image on a recording medium; and thermally fixing the recorded image.

BRIEF DESCRIPTION OF THE DRAWINGS

FIG. 1 is a schematic view showing an example of a structure of an ink-jet recording apparatus used for the ink jet recording method of the present invention.

DETAILED DESCRIPTION OF THE INVENTION

Hereinbelow, the ink composition for ink-jet recording of the present invention, the ink-jet recording method using the ink composition for ink-jet recording will be described in detail.

An ink composition for ink-jet recording of the present invention includes a pigment, resin particles having a glass transition temperature of 80° C. or higher, at least one water-soluble organic solvent, and water. A total mass of solid content in the ink composition for ink-jet recording is 10% by mass or more relative to the ink composition for ink-jet recording. The at least one water-soluble organic solvent includes at least one organic solvent having an SP value of 27.5 or lower. The amount of the at least one organic solvent having an SP value of 27.5 or lower is 70% by mass or more relative to a total amount of the at least one water-soluble organic solvent.

The ink composition for ink-jet recording may further include, other component(s), such as a surfactant, if necessary.

In the ink composition of the invention, the total mass of the solid content in the composition is 10% by mass or more. When the solid content in ink is lower than 10% by mass, the following may arise. When high speed recording is performed using, for example, a single pass method, treatment, such as drying or fixation, after recording is performed in a short time. Therefore, when a recording medium is further disposed on images after recording, image portions may transfer to the rear side of the recording medium (blocking) or when images are fixed by bringing members, such as a roller, into contact with the images after recording in, for example, fixation by application of heat and pressure, the images may transfer to the roller or the like to cause roller stain or image defects (offset).

In the invention, the upper limit of the total mass of the solid content is preferably 20% by mass from the viewpoint of effectively preventing the occurrence of blocking and offset. In particular, the total mass of the solid content is more preferably in the range of from 10.5% by mass to 15% by mass based on the same reasons as above.

The solid content in the invention refers to the total mass of pigments, pigment dispersants, and resin particles.

Pigment

The ink composition of the present invention includes at least one kind of pigment. The pigment used in the invention is not particularly limited, and may be appropriately selected according to the purpose. Any of organic pigments and inorganic pigments may be used.

Examples of the organic pigments include azo pigments, polycyclic pigments, dye chelates, nitro pigments, nitroso pigments, aniline black. Among these, azo pigments and polycyclic pigments are more preferred.

Examples of the azo pigments include azo lakes, insoluble azo pigments, condensed azo pigments, chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, quinophthalone pigments. Examples of the dye chelates include basic dye type chelates, acidic dye type chelates.

Examples of the inorganic pigments include titanium oxide, iron oxide, calcium carbonate, barium sulfate, aluminum hydroxide, barium yellow, cadmium red, chrome yellow, carbon black. Among these, carbon black is particularly preferred. Examples of carbon black include those produced according to any of known methods such as a contact method, a furnace method and a thermal method.

Among these pigments, a water-dispersible pigment is preferable.

Specific examples of the water-dispersible pigment include the following pigments of (1) to (4).

(1) An encapsulated pigment, that is, a polymer dispersion in which a pigment is incorporated in polymer particles. More specifically, the encapsulated pigment is a pigment coated with a hydrophilic and water-insoluble resin and has hydrophilicity due to the resin layer provided on the surface of the pigment, and therefore, the encapsulated pigment is dispersible in water.

(2) A self-dispersing pigment, that is, a pigment which has at least one kind of hydrophilic group at the surface, and exhibits at least any of water-solubility and water-dispersibility in the absence of dispersant. More specifically, the self-dispersing pigment is a pigment produced mainly by subjecting carbon black or the like to a surface oxidation treatment to render the pigment hydrophilic, and thus making the pigment per se to disperse in water.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

Among these, preferred are the (1) encapsulated pigment and (2) self-dispersing pigment, and particularly preferred is the (1) encapsulated pigment.

Here, the (1) encapsulated pigment will be described in detail.

The resin for the encapsulated pigment (hereinafter, the resin for the encapsulated pigment may also be referred to as a "water-insoluble polymer dispersant") is not limited, but the resin is preferably a polymer compound having self-dispersing ability or dissolving ability in a mixed solvent of water and a water-soluble organic solvent, and having an anionic group (acidic). Usually, this resin preferably has a number average molecular weight in the range of about 1,000 to about 100,000, and more preferably in the range of about 3,000 to about 50,000. It is also preferable that this resin be dissolved in an organic solvent to form a solution. When the number average molecular weight of the resin is within this range, the resin may exhibit its function as a coating layer for the pigment, or as a coating layer when used in an ink. The resin is preferably used in the form of a salt of an alkali metal or an organic amine.

Specific examples of the resin for the encapsulated pigment include materials having an anionic group, such as thermoplastic, thermosetting or modified acrylic, epoxy-based, polyurethane-based, polyether-based, polyamide-based, unsaturated polyester-based, phenolic, silicone-based or fluorine-based resins; polyvinyl-based resins such as vinyl chloride, vinyl acetate, polyvinyl alcohol or polyvinyl butyral; polyester-based resins such as alkyd resins and phthalic acid resins; amino-based materials such as melamine resins, melamine-formaldehyde resins, aminoalkyd co-condensated resins, urea resins, and urea resins; or copolymers or mixtures thereof.

The anionic acrylic resins may be obtained by, for example, polymerizing an acrylic monomer having an anionic group (hereinafter, referred to as "anionic group-containing acrylic monomer") and if necessary, another monomer capable of being copolymerized with the anionic group-containing acrylic monomer, in a solvent. Examples of the anionic group-containing acrylic monomer include acrylic monomers having one or more anionic groups selected from the group consisting of a carboxyl group, a sulfonic acid group and a phosphonic acid group, and among them, acrylic monomers having a carboxyl group are particularly preferred. Specific examples of the acrylic monomer having a carboxyl group include acrylic acid, methacrylic acid, crotonic acid, ethacrylic acid, propylacrylic acid, isopropylacrylic acid, itaconic acid, fumaric acid. Among these, acrylic acid or methacrylic acid is preferred.

The encapsulated pigment may be produced by a conventional physical or chemical method, using the above-described components. For example, the encapsulated pigment may be produced by the methods described in JP-A Nos. 9-151342, 10-140065, 11-209672, 11-172180, 10-25440 or 11-43636. Specific examples of the method include the phase inversion emulsification method and acid precipitation method described in JP-A Nos. 9-151342 and 10-140065, respectively, and among them, the phase inversion emulsification method is preferred in view of dispersion stability. The phase inversion emulsification method will be described later.

The aforementioned self-dispersing pigment is also one of preferred examples. The self-dispersing pigment is a pigment which has a large number of hydrophilic functional groups and/or salts thereof (hereinafter, referred to as "dispersibility imparting group") bonded to the pigment surface directly or indirectly via an alkyl group, an alkyl ether group, an aryl group or the like, and is capable of dispersing in an aqueous medium without using a dispersant for pigment dispersion. Here, the term "dispersing in an aqueous medium without using a dispersant" implies that the pigment is capable of being dispersed in an aqueous medium even though a dispersant for dispersing pigments is not used.

Since an ink containing a self-dispersing pigment as the colorant does not need to include a dispersant which is usually incorporated to disperse pigments, it is possible to easily prepare an ink in which foaming due to decrease in the defoaming property caused by the dispersant (that is, foaming associated with the use of the dispersant) scarcely occur, and which has excellent ejection stability. Examples of the dispersibility imparting group that is bonded to the surface of the self-dispersing pigment include —COOH, —CO, —OH, —$SO_3H$, —$PO_3H_2$ and quaternary ammonium, and salts thereof. The dispersibility imparting group may be bonded to the surface of the pigment by applying a physical treatment or a chemical treatment to the pigment, thereby bonding (grafting) the dispersibility imparting group or an active species having a dispersibility imparting group to the pigment surface. As the physical treatment, examples thereof include vacuum plasma treatment. Examples of the chemical treatment include a wet oxidation method of oxidizing the pigment surface in water by an oxidizing agent; a method of bonding a carboxyl group via a phenyl group by bonding p-aminobenzoic acid to the pigment surface.

The self-dispersing pigment in the invention may be, for example, a self-dispersing pigment which is surface treated by an oxidation treatment using hypohalous acid and/or hypohalite, or an oxidation treatment using ozone.

As the self-dispersing pigment, a commercially available product may be used, and examples of the commercially available self-dispersing pigment include MICROJET CW-1 (trade name; manufactured by Orient Chemical Industries, Ltd.), CAB-O-JET200, CAB-O-JET300 (trade name; manufactured by Cabot Corp.).

As the pigment, an encapsulated pigment in which, among pigment dispersants, a water-insoluble resin is used and the surface of a pigment is at least partially coated with the water-insoluble resin, e.g., a polymer emulsion in which a pigment is contained in water-insoluble resin particles, is preferable. Specifically, a water dispersible pigment in which a pigment is at least partially coated with a water-insoluble resin, and which has a resin layer formed on the surface of the pigment, and can dissolve in water is preferable. The use of such a capsulated pigment coated with a water-insoluble resins is preferable from the viewpoint of aggregation properties and preferable in that high resolution images can be formed when high-speed recording is performed.

Here, the phase inversion emulsification method will be described.

a) Phase Inversion Emulsification Method

The phase inversion emulsification method is a self-dispersing (phase inversion emulsification) method in which a mixed molten product of a pigment and a resin having a self-dispersing ability or dissolving ability, is dispersed in water. This mixed molten product may include a curing agent or a polymer compound. Here, the mixed molten product may be a state in which ingredients are mixed but are not dissolved, a state in which ingredients are dissolved and mixed, or a state in which these two states are included. Specific examples of a production method of the "phase inversion emulsification method" include a method described in JP-A No. 10-140065.

Specific examples of the phase inversion emulsification method and the acid precipitation method may be referred in the description of each of JP-A Nos. 9-151342 and 10-1400645.

—Pigment Dispersant—

Pigment dispersants can be used for easily disperse the pigment when the pigment is dispersed and for stabilizing dispersion status after the pigment is dispersed. Examples of the pigment dispersants include nonionic compounds, anionic compounds, cationic compounds, and amphoteric compounds. Examples of the pigment dispersant include copolymers of monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, diester maleate, fumaric acid, fumaric acid monoester, vinylsulfonic acid, styrene sulfonic acid, sulfonated vinyl naphthalene, vinyl alcohol, acrylamide, methacryloxyethyl phosphate, bis methacryloxyethyl phosphate, methacryloxyethylphenyl acid phosphate, ethylene glycol dimethacrylate, diethylene glycol dimethacrylate, styrene derivatives, such as styrene, $\alpha$-methyl styrene, and vinyltoluene, vinylcyclohexane, vinylnaphthalene, vinyl naphthalene derivatives, acrylic acid alkyl esters which may be substituted by an aromatic group, acrylic acid phenyl ester, methacrylic acid alkyl esters which may have be substituted by an aromatic group, methacrylic acid phenyl ester, methacrylic acid cycloalkyl ester, crotonic acid alkyl ester, itaconic acid dialkyl ester, maleic acid dialkyl ester, and derivatives of the compounds mentioned above.

A polymer or copolymer obtained by polymerizing one kind of monomer having an $\alpha,\beta$-ethylenic unsaturated group singly or copolymerizing two or more kinds of the monomers having an $\alpha,\beta$-ethylenic unsaturated group can be used as high molecular weight dispersants. Specific examples thereof include an alkyl acrylate-acrylic acid copolymer, an alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, polyester, and polyvinyl alcohol.

The pigment dispersant preferably has a weight average molecular weight of 2,000 to 60,000.

The addition amount of the pigment dispersant is preferably from 10% to 100%, more preferably from 20% to 70%, and still more preferably from 40% to 50% based on mass, relative to the pigment.

One kind of pigment may be used singly or two or more kinds of pigments may be selected from the same group or the same or different groups described above may be used in combination.

The content of the pigment(s) in the ink composition is preferably from 0.1 to 15% by mass, more preferably from 0.5% by mass to 12% by mass, and even more preferably from 1% by mass to 10% by mass, relative to the total mass of the ink from the viewpoint of color density, graininess, ink stability, and ejection reliability.

Resin Particles

The ink composition of the invention contains at least one kind of resin particles having a glass transition temperature of 80° C. or higher. When the ink composition contains resin particles having a glass transition temperature of 80° C. or higher, the fixability of the ink composition to a recording medium and the blocking resistance, offset resistance, and scratch resistance of images to be formed can be effectively improved.

It is preferable that the resin particles have a function of fixing the ink composition, i.e., an image, by aggregating or destabilizing dispersion upon contact with a treatment liquid described later or a paper area on which the treatment liquid is dried to thereby increase the viscosity of ink. Such resin particles are preferably dispersed in at least one of water and an organic solvent.

The glass transition temperature of the resin particles is 80° C. or higher. The glass transition temperature of the resin particles is preferably from 100° C. to 300° C., more preferably from 130° C. to 250° C., and still more preferably from 160° C. to 200° C. When the glass transition temperature of the resin particles to be contained is 300° C. or lower, the scratch resistance of images to be formed may more effectively improve.

The glass transition temperature of resin particles (polymer particles) can be controlled as appropriate by generally-used methods. For example, the glass transition temperature of resin particles can be controlled in a desired range by, selecting as appropriate the type of polymerizable groups of monomers used in the resin, the type and constituent ratio of substituents on the monomers, the molecular weight of polymer molecules contained in the resin particles, etc.

As the glass transition temperature, the measured Tg obtained by actual measurement is used. Specifically, the measured Tg refers to a value measured under usual measurement conditions using a differential scanning calorimeter (DSC) EXSTAR6220 (trade name) manufactured by SII Nanotechnology Inc. When the measurement is difficult due to decomposition of resin or the like, the calculated Tg obtained by calculation by the following calculation formula is used. The calculated Tg was obtained by calculation by Equation (1).

$$1/Tg = \Sigma(X_i/Tg_i) \quad (1)$$

In Equation (1), a polymer as a calculation target is assumed that n kinds of monomer components of i=1 to n are copolymerized. Xi is the weight fraction ($\Sigma X_i=1$) of the i-th monomer and $Tg_i$ is the glass transition temperature (absolute temperature) of a homopolymer of the i-th monomer. $\Sigma$ is the sum of i=1 to n. As the value (Tgi) of the glass transition temperature of a homopolymer of each monomer, the values described in "Polymer Handbook" (3rd Edition) (edited by J. Brandrup and E. H. Immergut (Wiley-Interscience, 1989)) are employed.

The resin particles are not particularly limited insofar as they have a desired glass transition temperature. Examples of the resin particles include resin particles of resin, such as thermoplastic acrylic, epoxy, polyurethane, polyether, polyamide, unsaturated polyester, phenol, silicone, or fluoro resin, polyvinyl resin, such as vinyl chloride, vinyl acetate, polyvinyl alcohol, or polyvinyl butyral, polyester resin, such as alkyd resin or phthalic resin, or copolymers or mixtures thereof.

As the resin particles, particles of a self-dispersing polymer particle (hereinafter, may be referred to as self-dispersing polymer particles) are preferred and self-dispersing polymer particles having a carboxyl group are more preferred, from a view point of the ejection stability and the liquid stability (particularly, dispersion stability) in a case of using the pigment. The self-dispersing polymer particles mean particles of a water-insoluble polymer which can form a dispersed state in an aqueous medium by means of a functional group (particularly, an acidic group or a salt thereof) included in the polymer per se in the absence of an additional surfactant, and are water-insoluble polymer particles which do not contain an additional separate emulsifier.

Further, when the self-dispersing polymer is used, delaying in aggregation caused by the separate dispersant may be less likely to occur. Therefore, using the self-dispersing polymer is preferable from the viewpoint of aggregating properties, and is also preferable since a high resolution image may be formed when high speed recording is employed.

The meaning of "dispersed state" includes an emulsified state where the water-insoluble polymer is dispersed in a liquid state in an aqueous medium (emulsion) and a dispersed state where the water-insoluble polymer is dispersed in a solid state in the aqueous medium (suspension).

The water-insoluble polymer in the invention is preferably such a water-insoluble polymer that can form a dispersed state where the water-insoluble polymer is dispersed in a solid state, from a view point of the aggregation speed and the fixing property when it is used in a liquid composition.

The dispersed state of the self-dispersing polymer particles means such a state where stable presence of a dispersed state can be confirmed visually at 25° C. for at least one week after mixing and stirring a solution in which 30 g of a water-insoluble polymer is dissolved into 70 g of an organic solvent (for example, methyl ethyl ketone), a neutralizing agent capable of neutralizing a salt-forming group of the water-insoluble polymer to 100% (sodium hydroxide when the salt forming group is anionic or acetic acid when the group is cationic), and 200 g of water (apparatus: a stirrer equipped with a stirring blade, number of rotation: 200 rpm, 30 min, 25° C.), and then removing the organic solvent from the liquid mixture.

The water-insoluble polymer means a polymer which is dissolved in an amount (amount of dissolution) of 10 g or less when the polymer is dried at 105° C. for 2 hours and then dissolved in 100 g of water at 25° C. The amount of dissolution is, preferably, 5 g or less and, more preferably, 1 g or less. The amount of dissolution is the amount of dissolution when the polymer is neutralized to 100% with sodium hydroxide or acetic acid in accordance with the kind of the salt-forming group of the water-insoluble polymer.

The aqueous medium contains water and may optionally contain a hydrophilic organic solvent. In the invention, the aqueous medium preferably includes water and the hydrophilic organic solvent in an amount of 0.2% by mass or less relative to water and, more preferably, the aqueous medium consists of water.

The main chain skeleton of the resin used in the resin particles in the invention is not particularly limited and, for example, a vinyl polymer or a condensated type polymer (epoxy resin, polyester, polyurethane, polyamide, cellulose, polyether, polyurea, polyimide, polycarbonate, etc.) can be used. Among them, a vinyl polymer is particularly preferred. From the viewpoint of dispersion stability of the resin particles, (meth)acrylic resin particles are more preferred.

(Meth)acrylic resin means methacrylic resin or acrylic resin.

Preferred examples of the vinyl polymer and the monomer used for the vinyl polymer include those described in JP-A Nos. 2001-181549 and 2002-88294. Further, vinyl polymers introduced with a dissociative group to a terminal end of a polymer chain by radical polymerization of a vinyl monomer using a chain transfer agent, a polymerization initiator, or an iniferter having a dissociative group (or a substituent that can be induced to the dissociative group) or by ionic polymerization using a compound having a dissociative group (or substituent that can be induced to the dissociative group) to an initiator or a terminator can also be used.

Preferred examples of condensated type polymers and monomers used for the condensated type polymers include those described in JP-A No. 2001-247787.

The self-dispersing polymer particles in the invention preferably contain a water-insoluble polymer containing a hydrophilic constituent unit and, as a hydrophobic constituent unit, at least one constituent unit derived from an alicyclic monomer, from a viewpoint of the self-dispersibility. In addition to these, the water-insoluble polymer may further include a constituent unit derived from an aromatic group-containing monomer.

The hydrophilic constituent unit is not particularly limited so long as it is derived from a hydrophilic group-containing monomer and it may be either a unit derived from one kind of hydrophilic group-containing monomer or a unit derived from two or more kinds of hydrophilic group-containing monomers. The hydrophilic group is not particularly limited and it may be either a dissociative group or a nonionic hydrophilic group.

The hydrophilic group is preferably a dissociative group from a view point of promoting the self-dispersibility and a view point of stability of the formed emulsified or dispersed state and, more preferably, an anionic dissociative group. Examples of the dissociative group include a carboxyl group, a phosphoric acid group, and a sulfonic acid group and, among them, the carboxyl group is preferred from a viewpoint of the fixing property when the ink composition is formed.

The hydrophilic group-containing monomer in the invention is preferably a dissociative group-containing monomer and, preferably, a dissociative group-containing monomer having a dissociative group and an ethylenically unsaturated bond from a viewpoint of the self-dispersibility and the aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methyl succinic acid, etc. Specific examples of the unsaturated sulfonic acid monomer include styrene sulfonic acid, 2-acrylamide-2-methylpropane sulfonic acid, 3-sulfopropyl(meth)acrylate, and bis(3-sulfopropyl)-itaconic acid ester. Specific examples of the unsaturated phosphoric acid monomer include vinyl phosphonic acid, vinyl phosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, the unsaturated carboxylic acid monomer is preferred and, at least one of acrylic acid and methacrylic acid are more preferred from a viewpoint of the dispersion stability and the ejection stability.

Examples of monomers having a nonionic hydrophilic group include: ethylenically unsaturated monomers containing a (poly)ethyleneoxy group or a polypropyleneoxy group, such as 2-methoxy ethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight of from 200 to 1,000) monomethacrylate, or polyethylene glycol (molecular weight of from 200 to 1,000) monomethacrylate; and ethylenically unsaturated monomers containing a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate.

The monomers containing a nonionic hydrophilic group are more preferably an ethylenically unsaturated monomer having alkyl ether at a terminal than an ethylenically unsaturated monomer having a hydroxyl group at a terminal from the viewpoint of the stability of the particles and the content of water-soluble components.

With respect to the hydrophilic constituent unit in the invention, preferable examples of the polymer include those containing only a hydrophilic unit containing an anionic dissociative group as a hydrophilic constituent unit and those containing both a hydrophilic constituent unit containing an anionic dissociative group and a hydrophilic constituent unit containing a nonionic hydrophilic group.

Preferable examples of the polymer further include those containing two or more kinds of hydrophilic units each containing an anionic dissociative group, and those containing two or more kinds of hydrophilic constituent units including one or more kinds of hydrophilic constituent units each containing an anionic dissociative group and one or more kinds of hydrophilic constituent units each containing a nonionic hydrophilic group in combination.

The content of the hydrophilic constituent units in the self-dispersing polymer is preferably 25% by mass or lower, more preferably from 1% by mass to 25% by mass, still more preferably from 2% by mass to 23% by mass, and particularly preferably from 4% by mass to 20% by mass, from the viewpoint of viscosity and stability over time of the ink composition.

When two or more kinds of hydrophilic constituent units are contained, the total content of the hydrophilic constituent units is preferably in the range mentioned above.

The content of the constituent unit containing an anionic dissociative group in the self-dispersing polymer is preferably in a range by which the acid value is in a preferable range described below.

The content of the constituent unit having a nonionic hydrophilic group is preferably from 0 to 25% by mass, more preferably from 0 to 20% by mass, and particularly preferably from 0 to 15% by mass from the viewpoint of ejection stability and stability over time.

The self-dispersing polymer particles in the invention preferably contain a polymer containing a carboxyl group and more preferably contain a polymer containing a carboxyl group and having an acid value (mgKOH/g) of from 25 to 100, from the viewpoint of self-dispersibility and an aggregation rate when contacting the treatment liquid which will be described below. Furthermore, the acid value is more preferably from 25 to 80 and particularly preferably from 30 to 65 from the viewpoint of self-dispersibility and an aggregation rate when contacting the treatment liquid.

In particular, when the acid value is 25 or more, the stability of self-dispersibility becomes favorable and when the acid value is 100 or lower, aggregation properties increase.

The alicyclic monomer is not particularly limited insofar as it is a compound containing an alicyclic hydrocarbon group and a polymerizable group, and is preferably alicyclic(meth)acrylate from the viewpoint of dispersion stability.

The alicyclic(meth)acrylate has a structural portion derived from (meth)acrylic acid and a structural portion derived from alcohol, and the structural portion derived from alcohol contains at least one unsubstituted or substituted alicyclic hydrocarbon group. The alicyclic hydrocarbon group may be the structural portion derived from alcohol itself or may be bonded to the structural portion derived from alcohol via a linking group.

The "alicyclic(meth)acrylate" refers to methacrylate or acrylate having an alicyclic hydrocarbon group.

The alicyclic hydrocarbon group is not particularly limited insofar as it contains a cyclic non-aromatic hydrocarbon group. Examples thereof include a monocyclic hydrocarbon group, a bicyclic hydrocarbon group, and a polycyclic hydrocarbon group of tri- or higher cycle.

Examples of the alicyclic hydrocarbon group include cycloalkyl groups, such as a cyclopentyl group or a cyclohexyl group, a cyclo alkenyl group, a bicyclo hexyl group, a norbornyl group, an isobornyl group, a dicyclopentanil group, a dicyclopentenyl group, an adamanthyl group, a decahydronaphthalenyl group, a perhydro fluorenyl group, and a tricyclo[$5.2.1.0^{2,6}$]decanyl group, and bicyclo[4.3.0] nonane.

The alicyclic hydrocarbon group may further have a substituent. Examples of the substituent include an alkyl group, an alkenyl group, an aryl group, an aralkyl group, an alkoxy group, a hydroxy group, a primary amino group, a secondary amino group, a tertiary amino group, an alkyl carbonyl group, an aryl carbonyl group, and a cyano group.

The alicyclic hydrocarbon group may further form a condensed ring.

The alicyclic hydrocarbon group in the invention preferably has an alicyclic hydrocarbon group portion having 5 to 20 carbon atoms from the viewpoint of viscosity and solubility.

Examples of a linking group for bonding the alicyclic hydrocarbon group to the structural portion derived from alcohol include an alkyl group, an alkenyl group, an alkylene group, an aralkyl group, an alkoxy group, a mono- or oligo-ethylene glycol group, and a mono- or oligo-propylene glycol group, each having 1 to 20 carbon atoms.

Specific example of the alicyclic(meth)acrylate in the invention are shown below, but the invention is not limited thereto. One kind of these compounds may be used singly, or two or more kinds may be used in combination.

Examples of the monocyclic(meth)acrylate include cycloalkyl(meth)acrylate having a cycloalkyl group having 3 to 10 carbon atoms, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl (meth)acrylate, cyclononyl(meth)acrylate, and cyclodecyl (meth)acrylate.

Examples of the bicyclic(meth)acrylate include isobornyl (meth)acrylate and norbornyl(meth)acrylate.

Examples of the tricyclic(meth)acrylate include adamanthyl(meth)acrylate, dicyclopentanil(metha)acrylate, and dicyclopentenyloxyethyl(meth)acrylate.

Among the above, from the viewpoint of the dispersion stability of the self-dispersing polymer particles, fixability, and blocking resistance, at least either one of the bicyclic (meth)acrylate or the polycyclic(meth)acrylate of tri- or higher cycle is preferable and at least one selected from isobornyl(meth)acrylate, adamanthyl(meth)acrylate, and dicyclopentanil(meth)acrylate is more preferable.

In the invention, the content of the constituent unit derived from the alicyclic(meth)acrylate contained in the self-dispersing polymer particles is preferably from 20% by mass to 90% by mass and more preferably from 40% by mass to 90% by mass from the viewpoint of the stability of a self-dispersion state, stabilization of the particle shape in an aqueous medium due to hydrophobic interaction of alicyclic hydrocarbon groups, and reduction in the amount of water-soluble components due to appropriate hydrophobizing of particles. The content thereof is particularly preferably from 50% by mass to 80% by mass.

When the content of the constituent unit derived from alicyclic(meth)acrylate is 20% by mass or more, fixability and blocking may be improved. In contrast, when the constituent unit derived from alicyclic(meth)acrylate is 90% by mass or lower, the stability of polymer particles may be improved.

When a constituent unit derived from an aromatic group-containing monomer is included, the aromatic group-containing monomer is not particularly limited so long as it is a compound containing an aromatic group and a polymerizable group. The aromatic group may be either a group derived from an aromatic hydrocarbon or a group derived from an aromatic heterocyclic ring. In the invention, the aromatic group is preferably an aromatic group derived from the aromatic hydrocarbon, from a viewpoint of particle shape stability in the aqueous medium.

The polymerizable group may be either a polycondensating polymerizable group or an addition polymerizing polymerizable group. The polymerizable group is preferably an addition polymerizing polymerizable group, and more preferably, a group containing an ethylenically unsaturated bond from a viewpoint of particle shape stability in the aqueous medium.

The aromatic group-containing monomer in the invention is preferably a monomer containing an aromatic group derived from an aromatic hydrocarbon and an ethylenically unsaturated bond. One kind of the aromatic group-containing monomer may be used singly or two or more kinds of the aromatic group-containing monomers may be used in combination.

Examples of the aromatic group-containing monomer include phenoxyethyl(meth)acrylate, benzyl(meth)acrylate, phenyl(meth)acrylate, and styrenic monomer. Among them, from a viewpoint of the balance between the hydrophilicity and the hydrophobicity of the polymer chain and the ink fixing property, an aromatic group-containing (meth)acrylate monomer is preferred, and at least one selected from the group consisting of phenoxyethyl(meth)acrylate, benzyl (meth)acrylate, and phenyl(meth)acrylate is more preferable and, phenoxyethyl(meth)acrylate and benzyl(meth)acrylate are still more preferred.

"(Meth)acrylate" means acrylate or methacrylate, "(meth) acrylamide" means acrylamide or methacrylamide, and "(meth)acrylic" means acrylic or methacrylic.

When a styrene monomer is used as an aromatic group-containing monomer, the content of a constituent unit derived from a styrene monomer is preferably 20% by mass or lower, more preferably 10% by mass or lower, and still more preferably 5% by mass or lower, from the viewpoint of stability of self-dispersing polymer particles in which the monomer is used. It is further preferable that the self-dispersing polymer do not contain the constituent unit derived from a styrene monomer.

Here, the styrene monomer refers to styrene, substituted styrene (α-methyl styrene, chlorostyrene, etc.), or a styrene macromer having a polystyrene structural unit.

The self-dispersing polymer particles in the invention may optionally include, for example, as a hydrophobic constituent unit, additional constituent unit(s) as well as a constituent unit derived from an aromatic group-containing monomer, in addition to a constituent unit derived from an alicyclic monomer.

The monomer which may be used for forming the additional constituent unit (hereinafter, may also be referred to as an "additional copolymerizable monomer") is not particularly limited so long as it is a monomer copolymerizable with the hydrophilic group-containing monomer, the aromatic group-containing monomer and the alicyclic monomer. An alkyl group-containing monomer is preferred from a viewpoint of the flexibility of the polymer skeleton or easiness in control for the glass transition temperature (Tg).

Examples of the alkyl group-containing monomer include alkyl(meth)acrylates such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, and ethylhexyl (meth)acrylate; ethylenically unsaturated monomers having a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate; dialkylamino alkyl (meth)acrylates such as dimethylaminoethyl(meth)acrylate; (meth)acrylamides, for example, N-hydroxyalkyl(meth) acrylamide such as N-hydroxymethyl(meth)acrylamide, N-hydroxyethyl(meth)acrylamide, and N-hydroxybutyl (meth)acrylamide; and N-alkoxyalkyl(meth)acrylamides such as N-methoxymethyl(meth)acrylamide, N-ethoxymethyl(meth)acrylamide, N-(n-, iso)butoxymethyl(meth)acrylamide, N-methoxyethyl(meth)acrylamide, N-ethoxyethyl (meth)acrylamide, and N-(n-, iso)butoxyethyl(meth) acrylamide.

In particular, from the viewpoint of the flexibility of a polymer skeleton or ease of control of the glass transition temperature (Tg) and from the viewpoint of dispersion stability of a self-dispersing polymer, at least one of (meth) acrylates containing a chain alkyl group having 1 to 8 carbon atoms is preferable, (meth)acrylates containing a chain alkyl group having 1 to 4 carbon atoms are more preferable, and methyl(meth)acrylate or ethyl(meth)acrylate is particularly preferable. Here, the chain alkyl group refers to an alkyl group having a straight chain or a branched chain.

In the invention, one kind of the additional copolymerizable monomers may be used singly or two or more kinds of the additional copolymerizable monomers may be used in combination.

When the self-dispersing polymer particles contain the additional constituent units, the content thereof is preferably from 10% by mass to 80% by mass, more preferably from 15% by mass to 75% by mass, and particularly preferably from 20% by mass to 70% by mass. When two or more kinds of monomers are used in combination for forming the additional constituent unit(s), the total content thereof is preferably in the range described above.

The self-dispersing polymer in the invention is also preferably a polymer obtained by polymerizing at least three kinds of substances of at least one alicyclic(meth)acrylate, an additional copolymerizable monomer including an aromatic group-containing (meth)acrylate, and a hydrophilic group-containing monomer, from the viewpoint of dispersion stability, and more preferably a polymer obtained by polymerizing at least three kinds of substances of at least one alicyclic (meth)acrylate, (meth)acrylate containing a straight chain or branched chain alkyl group having 1 to 8 carbon atoms, and a hydrophilic group-containing monomer.

In the invention, the self-dispersing polymer is preferably a self-dispersing polymer which does not substantially contain a constituent unit having a substituent having high hydrophobicity such as a constituent unit derived from (meth)acrylate having a straight chain or branched chain alkyl group having 9 or more carbon atoms, a constituent unit derived from an aromatic group-containing macromonomer or the like, and the self-dispersing polymer is more preferably a self-dispersing polymer which does not contain a constituent unit having a substituent having high hydrophobicity such as a constituent unit derived from (meth)acrylate having a straight chain or branched chain alkyl group having 9 or more carbon atoms, a constituent unit derived from an aromatic group-containing macromonomer or the like, from the viewpoint of dispersion stability.

The self-dispersing polymer in the invention may be a random copolymer in which each constituent unit is irregularly introduced or a block copolymer in which each constituent unit is regularly introduced. In the case of a block copolymer, each constituent unit may be synthesized in any introduction order and the same constituent may be used twice or more. A random copolymer is preferable in terms of versatility and manufacturability.

The molecular weight of the self-dispersing polymer in the invention is, preferably, from 3,000 to 200,000 and, more preferably, from 5,000 to 150,000 and, further preferably, from 10,000 to 100,000 as the weight average molecular weight. Further, the self-dispersing polymer preferably has an acid value of from 25 to 100 and a weight average molecular weight of from 3,000 to 200,000, and the self-dispersing polymer more preferably has an acid value of from 25 to 95 and a weight average molecular weight of from 5,000 to 150,000. When the weight average molecular weight is 3,000 or more, the amount of the water-soluble component can be suppressed effectively. Further, when the weight average molecular weight is 200,000 or less, the self-dispersion stability can be increased.

The weight average molecular weight is measured by gel permeation chromatography (GPC). In GPC, HLC-8020GPC (manufactured by Tosoh Corporation) is used, and 3 pieces of columns of TSKgel Super HZM-H, TSK gel Super HZ4000 and TSK gel Super HZ200 (trade names, manufactured by Tosoh Corporation, 4.6 mm ID×15 cm) are used, and THF (tetrahydrofuran) is used as an eluate.

It is preferable that the self-dispersing polymer in the invention contain constituent unit(s) derived from alicyclic (meth)acrylate(s) (preferably structural units derived from at least one of isobornyl(meth)acrylate, adamanthyl(meth)acrylate, and dicyclopentanyl(meth)acrylate) in a proportion of from 15% by mass to 80% by mass of the total mass of the self-dispersing polymer particles as a copolymerization ratio, have an acid value of from 25 to 100, and a weight average molecular weight of from 3000 to 200,000 from the viewpoint of controlling hydrophilic and hydrophobic properties of the polymers.

It is also preferable that the self-dispersing polymer contain constituent unit(s) derived from alicyclic (meth)acrylate(s) (preferably structural unit(s) derived from at least one of isobornyl(meth)acrylate, adamanthyl(meth)acrylate, and dicyclopentanyl(meth)acrylate) in a proportion of from 15% by mass to 80% by mass of the total mass of the self-dispersing polymer particles as a copolymerization ratio, a constituent unit derived from carboxyl group-containing monomer(s), and a constituent unit derived from alkyl group-containing monomer(s) (preferably a structural unit derived from an alkyl ester of (meth)acrylic acid) from the viewpoint of controlling hydrophilic and hydrophobic properties of the polymers. It is more preferable that the self-dispersing polymers contain structural unit(s) derived from at least one of isobornyl (meth)acrylate, adamanthyl (meth)acrylate, and dicyclopentanyl(metha)acrylate in a proportion of from 15 to 80% by mass as a copolymerization ratio, a constituent unit derived from carboxyl group-containing monomer(s), and a constituent unit derived from alkyl group-containing monomer(s) (preferably a structural unit derived from an alkyl ester (having 1 to 4 carbon atoms) of (meth)acrylic acid), have an acid value of from 25 to 95, and have a weight average molecular weight of from 5,000 to 150,000.

It is also preferable that the self-dispersing polymer of the invention be a vinyl polymer containing structure(s) derived from alicyclic (meth)acrylate(s) (preferably structural unit(s) derived from at least one of isobornyl(meth)acrylate, adamanthyl(meth)acrylate, and dicyclopentanyl(meth)acrylate) in a proportion of from 20% by mass to 90% by mass as a copolymerization ratio, a structure derived from dissociative group-containing monomer(s), at least one structure derived from (meth)acrylate(s) containing a chain alkyl group having 1 to 8 carbon atoms, have an acid value of from 20 to 120, have a total content of hydrophilic structural units of 25% by mass or lower, and have a weight average molecular weight of from 3,000 to 200,000, from the viewpoint of controlling hydrophilic and hydrophobic properties of the polymer. It is more preferable that the self-dispersing polymer of the invention be a vinyl polymer containing a structure derived from polycyclic (meth)acrylate(s) having two or three rings (preferably a structural unit derived from at least one of isobornyl (meth)acrylate, adamanthyl (meth)acrylate, and dicyclopentanyl (metha)acrylate) in a proportion of from 30% by mass to 90% by mass as a copolymerization ratio, a structure derived from (meth)acrylate(s) containing a chain alkyl group having 1 to 4 carbon atoms in a proportion of from 10% by mass to 80% by mass as a copolymerization ratio, and a structure derived from carboxyl group-containing monomer(s) in such an amount that the acid value is in the range of from 25 to 100, have a total content of hydrophilic structural units of 25% by mass or lower, and have a weight average molecular weight of from 10000 to 200,000. It is particularly preferable that the self-dispersing polymer of the invention be a vinyl polymer containing a structure derived from polycyclic (meth)acrylate(s) having two or three rings (preferably a structural unit derived from at least one of isobornyl (meth)acrylate, adamanthyl (meth)acrylate, and dicyclopentanyl(metha)acrylate) in a proportion of from 40% by mass to 80% by mass as a copolymerization ratio, a structure derived at least from methyl(meth)acrylate(s) or ethyl (meth)acrylate(s) in a proportion of from 20% by mass to 70% by mass as a copolymerization ratio, and a structure derived from acrylic acid(s) or methacrylic acid(s) in such an amount that the acid value is in the range of from 30 to 80, have a total content of hydrophilic structural units of 25% by mass or lower, and have a weight average molecular weight of from 30,000 to 150,000.

Examples of polymers used in the resin particles include following alicyclic group-containing polymers, but the invention is not limited to the following examples. The ratio in the brackets represents the mass ratio of copolymerization components. When the glass transition temperature is "calculated Tg", the glass transition temperature is a value obtained by the calculation according to Equation (1) previously described above using a Tg value of a homopolymer of each of the following monomers. That is, Tg of a homopolymer of methyl methacrylate is 105° C., Tg of a homopolymer of isobornyl methacrylate is 156° C., Tg of a homopolymer of benzyl methacrylate is 54° C., Tg of a homopolymer of methacrylic acid is 130° C., Tg of a homopolymer of adamantyl methacrylate is 140° C., and Tg of a homopolymer of dicyclopentanyl methacrylate is 128° C.

Methyl methacrylate/isobornyl methacrylate/methacryic acid copolymer (20/72/8), Glass transition temperature Tg: 180° C.

Methyl methacrylate/isobornyl methacrylate/methacryic acid copolymer (30/62/8), Glass transition temperature Tg: 170° C.

Methyl methacrylate/isobornyl methacrylate/methacryic acid copolymer (40/52/8), Glass transition temperature Tg: 160° C.

Methyl methacrylate/isobornyl methacrylate/methacryic acid copolymer (50/42/8), Glass transition temperature Tg: 150° C.

Methyl methacrylate/isobornyl methacrylate/benzyl methacrylate/methacryic acid copolymer (30/50/14/6), Glass transition temperature Tg: 123° C.

Methyl methacrylate/dicyclopentanyl methacrylate/methacryic acid copolymer (40/50/10), Glass transition temperature Tg: 130° C.

Methyl methacrylate/dicyclopentanyl methacrylate/phenoxy ethyl methacrylate/methacryic acid copolymer (30/50/14/6), Glass transition temperature Tg: 101° C.

Methyl meth acrylate/isobornyl methacrylate/methoxypolyethylene glycol methacrylate (n=2)/methacryic acid copolymer (30/54/10/6), Glass transition temperature Tg: 110° C.

Methyl methacrylate/dicyclopentanyl methacrylate/methoxypolyethylene glycol methacrylate (n=2)/methacryic acid copolymer (54/35/5/6), Glass transition temperature Tg: 100° C.

Methyl methacrylate/adamantyl methacrylate/methoxypolyethylene glycol methacrylate (n=23)/methacryic acid copolymer (30/50/15/5), Glass transition temperature Tg: 112° C.

Methyl methacrylate/isobornyl methacrylate/dicyclopentanyl methacrylate/methacryic acid copolymer (20/50/22/8), Glass transition temperature Tg: 139° C.

Ethyl methacrylate/cyclohexyl methacrylate/acrylic acid copolymer (50/45/5), Glass transition temperature Tg: 67° C.

Isobutyl methacrylate/cyclohexyl methacrylate/acrylic acid copolymer (40/50/10), Glass transition temperature Tg: 70° C.

n-butyl methacrylate/cyclohexyl methacrylate/styrene/acrylic acid copolymer (30/55/10/5), Glass transition temperature Tg: 86° C.

Methyl methacrylate/dicyclopentenyloxyethyl methacrylate/methacryic acid copolymer (40/52/8), Glass transition temperature Tg: 78° C.

Lauryl methacrylate/dicyclopentenyloxyethyl methacrylate/methacryic acid copolymer (3/87/10), Glass transition temperature Tg: 53° C.

The method of producing a water-insoluble polymer that is used in the resin particle in the invention is not particularly limited. Examples of the method of producing the water-insoluble polymer include a method of performing emulsion polymerization under the presence of a polymerizable surfactant thereby covalently-bonding the surfactant and the water-insoluble polymer, and a method of copolymerizing a monomer mixture containing the hydrophilic group-containing monomer and the aromatic group-containing monomer by a known polymerization method such as a solution polymerization method or a bulk polymerization method. Among the polymerization methods described above, the solution polymerization method is preferred and a solution polymerization method in which an organic solvent is used is more preferred from a viewpoint of aggregation speed and the stability of droplet ejection of the ink composition.

From a viewpoint of the aggregation speed, it is preferred that the self-dispersing polymer particles in the invention contain a polymer synthesized in an organic solvent, and the polymer has a carboxyl group (the acid value is preferably from 20 to 100), in which the carboxyl groups of the polymer are partially or entirely neutralized and the polymer is prepared as a polymer dispersion in a continuous phase of water. That is, the self-dispersing polymer particle in the invention is prepared by a method including a step of synthesizing the polymer in the organic solvent and a dispersion step of forming an aqueous dispersion in which at least a portion of the carboxyl groups of the polymer is neutralized.

The dispersion step preferably includes the following step (1) and step (2).

Step (1): stirring a mixture containing a polymer (water-insoluble polymer), an organic solvent, a neutralizing agent, and an aqueous medium.

Step (2): removing the organic solvent from the mixture.

The step (1) preferably a treatment that includes at first dissolving the polymer (water-insoluble polymer) in the organic solvent and then gradually adding the neutralizing agent and the aqueous medium, and mixing and stirring the mixture to obtain a dispersion. By adding the neutralizing agent and the aqueous medium to the solution of the water-insoluble polymer dissolved in the organic solvent, self-dispersing polymer particles having a particle size that enables higher storage stability can be obtained without requiring strong sharing force.

The method for stirring the mixture is not particularly limited and a mixing and stirring apparatus that is used generally can be used, and optionally, a disperser such as a ultrasonic disperser or a high pressure homogenizer can be used.

Preferable examples of the organic solvent include alcohol type solvents and ketone type solvents Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as isopropyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing polymer particles of small particle size with no aggregation settling or fusion between particles to each other and having high dispersion stability may be obtained.

The neutralizing agent is used to partially or entirely neutralize the dissociative groups so that the self-dispersing polymer can form a stable emulsified or dispersed state in water. In a case where the self-dispersing polymer of the invention has an anionic dissociative group (for example, carboxyl group) as the dissociative group, examples of the neutralizing agent to be used include basic compounds such as organic amine compounds, ammonia, and alkali metal hydroxides. Examples of the organic amine compounds include monomethyl amine, dimethyl amine, trimethyl amine, monoethyl amine, diethyl amine, triethyl amine, monopropyl amine, dipropyl amine, monoethanol amine, diethanol amine, triethanol amine, N,N-dimethyl-ethanol amine, N,N-diethyl-ethanol amine, 2-dimethylamino-2-methyl-1-propanol, 2-amino-2-methyl-1-propanol, N-methyldiethanol amine, N-ethyldiethanol amine, monoisopropanol amine, diisopropanol amine, and triisopropanol amine, etc. Examples of the alkali metal hydroxide include lithium hydroxide, sodium hydroxide and potassium hydroxide. Among them, sodium hydroxide, potassium hydroxide, triethylamine, and triethanol amine are preferred from a viewpoint of the stabilization of dispersion of the self-dispersing polymer particles of the invention into water.

The basic compound is used preferably in an amount of from 5 to 120 mol %, more preferably, from 10 to 110 mol %, and further preferably, from 15 to 100 mol %, relative to 100 mol % of the dissociative groups. When the basic compound is used in an amount of 15 mol % or more, the effect of stabilizing the dispersion of the particles in water may be obtained and when the basic compound is in an amount of 100% or less, the effect of decreasing the water-soluble component may be provided.

In the step (2), an aqueous dispersion of the self-dispersing polymer particles can be obtained by phase transfer to the aqueous system by distilling off the organic solvent from the dispersion obtained in the step (1) by a common method such as distillation under a reduced pressure. In the obtained aqueous dispersion, the organic solvent has been substantially removed and the amount of the organic solvent is preferably from 0.2% by mass or less and, more preferably, 0.1% by mass or less.

The average particle size of the resin particles is, as a volume average particle size, preferably in the range of 10 nm to 1 μm, more preferably in the range of from 10 nm to 200 nm, even more preferably in the range of from 10 nm to 100 nm, and particularly preferably in the range of from 10 nm to 50 nm. When the volume average particle size is 10 nm or more, production suitability may be enhanced, and when the volume average particle size is 1 μm or less, storage stability may be enhanced.

The particle size distribution of the resin particles is not particularly limited, and any of those particles having a broad particle size distribution or those particles having a monodisperse particle size distribution may be used. Two or more kinds of water-insoluble particles may be used as mixtures.

The average particle size and particle size distribution of the resin particles are determined by measuring the volume average particle size by a dynamic light scattering method, using a NANOTRACK particle size distribution analyzer (model name: UPA-EX150, manufactured by Nikkiso Co., Ltd.).

One kind of the resin particles (particularly, for example, self-dispersing polymer particles) can be used singly or two or more kinds thereof may be used in combination. The content of the resin particles in the ink composition is preferably 0.5 to 20% by mass, more preferably from 2% by mass to 20% by mass, and still more preferably from 3% by mass to 15% by mass, relative to the total mass of the ink composition.

The content of the resin particles relative to the total mass of the solid content in the ink composition is preferably 40% by mass or more. When the proportion relative to the total mass of the solid content is in the range mentioned above, in a case where high speed recording is performed using, for example, a single pass method, sufficient aggregation properties for obtaining high resolution images may be obtained and the occurrence of blocking and offset can be effectively suppressed. Moreover, the content of the resin particles in the ink composition is more preferably from 40% by mass to 90% by mass, still more preferably from 40% by mass to 80% by mass, and most preferably from 50% by mass to 70% by mass, relative to the total mass of the solid content in the ink composition.

Water-Soluble Organic Solvent

The ink composition of the invention contains at least one water-soluble organic solvent.

The water-soluble organic solvent may be used for drying prevention, wetting or penetration promotion. For drying prevention, the water-soluble organic solvent is used as a drying preventing agent for preventing clogging of an ink ejection opening of an ejection nozzle due to an aggregate formed of adhered and dried inks. For preventing drying and/or for wetting, water-soluble organic solvents having a low vapor pressure than that of water are preferable. For promoting penetration, the water-soluble organic solvents can be used as a penetration accelerator that increases penetration properties of inks in paper.

Examples of the water-soluble organic solvents include alkanediols (polyhydric alcohols), such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; saccharides, such as glucose, mannose, or fructose; sugar alcohols; hyaluronic acids; alkyl alcohols having 1 to 4 carbon atoms, such as ethanol, methanol, butanol, propanol, or isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, tripropylene glycol monomethyl ether, dipropylene glycol mono-n-propyl ether, or dipropylene glycol mono-iso-propyl ether; 2-pyrrolidone, and N-methyl-2-pyrrolidone. Only one kind of these alcohols may be used singly or two more kinds thereof may be used in combination.

For drying prevention or wetting, polyhydric alcohols are useful. Examples of the polyhydric alcohol include glycerol, ethylene glycol, diethylene glycol, triethylene glycol, propylene glycol, dipropylene glycol, tripropylene glycol, 1,3-butanediol, and 2,3-butanediol. Only one kind of these polyhydric alcohols may be used singly or two or more kinds thereof may be used in combination.

For promoting penetration, polyol compounds are preferable and aliphatic diols are suitable. Examples of the aliphatic diols include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among the above, preferable examples include 2-ethyl-1,3-hexanediol and 2,2,4-trimethyl 1,3-pentanediol.

In the ink composition of the invention, 70% by mass or more of the water-soluble organic solvents are water-soluble organic solvents having an SP value of 27.5 or lower. When the water-soluble organic solvents having an SP value of 27.5 or lower are used, the occurrence of curling under various environmental humidity after recording can be further suppressed. Moreover, the fixability may also increase due to interaction with resin particles. In particular, when the proportion of water-soluble organic solvents having a relatively low SP value are increased by adjusting the proportion of the water-soluble organic solvents having an SP value of 27.5 or lower to be 70% by mass or more of the whole water-soluble organic solvents, the scratch resistance of images can be increased and offset can be effectively suppressed.

The solubility parameter (SP value) of a water-soluble solvent as used in the invention is a value expressed by the square root of cohesive energy of molecules. SP values can be calculated by the method described in R. F. Fedors, *Polymer Engineering Science*, 14, pp. 147 to 154 (1974). The values used in this invention are preferably calculated by this method.

Specifically, in the method described in the above scientific article by R. F. Fedors, the solubility parameter (SP value) of a particular water-soluble solvent at 25° C. can be calculated using the following equation.

$$\delta = \left[ \frac{\sum_i \Delta e_i}{\sum_i \Delta v_i} \right]^{1/2}.$$

In the above equation $\delta$ represents the solubility parameter (SP value) of the water-soluble solvent at 25° C.; $\Delta e_i$ is the additive atomic and group contribution for the energy of vaporization of said solvent; $\Delta v_i$ is the additive atomic and group contribution for the molar volume of said solvent; and the summation index i represents the number of atoms or groups within the molecular structure of the water-soluble solvent. The contributions $\Delta e_i$ and $\Delta v_i$ at a temperature of 25° C. are listed in Table 5 on page 152 of Fedor's article as identified above. Hence, based on only the knowledge of the chemical structure of the particular water-soluble solvent, i.e. the atoms and groups constituting the molecular structure thereof, the required contributions $\Delta e_i$ and $\Delta v_i$ can be selected from Table 5 of Fedor's paper, and on their basis $\delta$ be calculated using the above equation. In the event that the water-soluble solvent has a cyclic structure, the solubility parameter thereof can be estimated from the properties of a linear compound having the same chemical structure, and adding a cyclization increment $\Delta e_i$ and $\Delta v_i$, which increment is also listed in Table 5 of the paper. More details and a concrete example for calculating the solubility parameter of a cyclic water-soluble solvent are provided on pages 152 and 153 of Fedor's paper.

As will be appreciated from the above, according to a preferred embodiment, the SP value of the water-soluble solvent for use in the present invention refers to the SP value at a temperature of 25° C.

In order to prevent clogging at a nozzle opening of a head due to drying of ink jet ink compositions at the nozzle head, the solvents can be used for preventing drying or wetting. For drying prevention or wetting, water-soluble organic solvents having a lower vapor pressure than that of water are preferable. In order to more sufficiently penetrate the ink composition in paper, the water-soluble organic solvents are preferably used for promoting the penetration.

Preferable examples of the water-soluble organic solvents having an SP value of 27.5 or lower include the following compounds.

Diethylene glycol monoethyl ether (SP value: 22.4)
Diethylene glycol monobutyl ether (SP value: 21.5)
Triethylene glycol monomethyl ether (SP value: 22.1)
Triethylene glycol monoethyl ether (SP value: 21.7)
Triethylene glycol monobutyl ether (SP value: 21.1)
Dipropylene glycol monomethyl ether (SP value: 21.3)
Dipropylene glycol (SP value: 27.2)
Tripropylene glycol monomethyl ether (20.4)

Alkylene oxide adduct of glycerol represented by the following Formula (1)

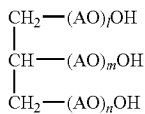

Formula (I)

In Formula (1), l, m, and n each independently represent an integer of 1 or more, and the sum of l, m and n (l+m+n) is from 3 to 15. When the value of l+m+n is 3 or more, the effect of suppressing curling may be favorable. When the value of l+m+n is 15 or lower, favorable ejection properties may be maintained. In particular, the value of l+m+n is preferably in the range of 3 to 12 and more preferably in the range of from 3 to 10. AO in Formula (1) represents ethyleneoxy (which may sometimes be abbreviated as EO) and/or propyleneoxy (which may sometimes be abbreviated as PO). In particular, a propyleneoxy group is preferable. Each AO of $(AO)_l$, $(AO)_m$, and $(AO)_n$ may be the same or different.

Examples of the compound represented by Formula (1) are shown below. The value in the brackets is an SP value.

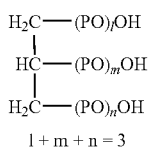

(26.4)

l + m + n = 3

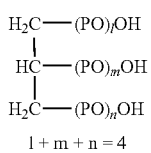

(24.9)

l + m + n = 4

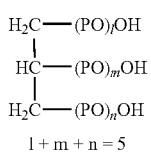

(23.9)

l + m + n = 5

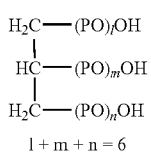

(23.2)

l + m + n = 6

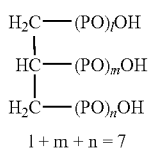

(22.6)

l + m + n = 7

PO=Propyleneoxy

Examples of the compound represented by Formula (1) further include the following compounds.

$nC_4H_9O(AO)_4$—H
(AO=EO or PO (EO:PO=1:1), SP value=20.1)
$nC_4H_9O(AO)_{10}$—H
(AO=EO or PO (EO:PO=1:1), SP value=18.8)
$HO(A'O)_{40}$—H
(A'O=EO or PO (EO:PO=1:3), SP value=18.7)
$HO(A''O)_{55}$—H
(A''O=EO or PO (EO:PO=5:6), SP value=18.8)
$HO(PO)_3$—H (SP value=24.7)
$HO(PO)_7$—H (SP value=21.2)
1,2-hexanediol (SP value=27.4)

EO represents an ethylene oxy group and PO represents a propyleneoxy group.

In the invention, the compound represented by Formula (1) is not limited to the above examples.

As the alkylene oxide adduct of glycerol, any of commercially available products currently marketed may be used. Examples of the commercial available alkylene oxide adduct of glycerol include, as polyoxypropylated glycerol (ether of polypropylene glycol and glycerol), SANNIX GP-250 (average molecular weight: 250), SANNIX GP-400 (average molecular weight: 400), and SANNIX GP-600 (average molecular weight: 600) (trade names, manufactured by Sanyo Chemical Industries, Ltd.), LEOCON GP-250 (average molecular weight: 250), LEOCON GP-300 (average molecular weight: 300), LEOCON GP-400 (average molecular weight: 400), LEOCON GP-700 (average molecular weight: 700) (trade names, manufactured by LION Corporation), and polypropylenetriol glycol·triol types (average molecular weight: 300; and average molecular weight: 700) (manufactured by Wako Pure Chemical Ind., Ltd.).

One kind of the water-soluble organic solvent can be used singly or two or more kinds may be used a mixture. The combination for the mixture is not particularly limited. When an alkylene oxide adduct of glycerol represented by Formula (1) and an alkylene glycol alkyl ether having an SP value of 23 or lower (preferably SP value of 22 or lower) (preferably di- or tri-alkylene glycol monoalkyl ether (the number of carbon atoms of the alkyl portion is preferably 1 to 4) are combined, the fixability further may increase and blocking of images can be effectively suppressed. In this case, the mixing ratio (a:b) of the alkylene oxide adduct of glycerol (a) represented by Formula (1) and the alkylene glycol alkyl ether having an SP value of 23 or lower (b) is preferably in the range of 1:5 to 5:1 and more preferably in the range of 1:2.5 to 2.5:1 based on the reasons as described above.

The ink composition preferably contains the water-soluble organic solvents in a proportion of lower than 20% by mass relative to the total mass of the composition. When high speed recording is performed using, for example, a single pass method, the content of the water-soluble organic solvents of lower than 20% by mass may be advantageous for performing treatment, such as drying, fixing, or the like after recording, in a short time and the occurrence of blocking and offset can be effectively suppressed.

In particular, the content of the water-soluble organic solvents is preferably 5% by mass or more and lower than 20% by mass and more preferably from 7% by mass to 17% by mass relative to the total mass of the composition.

Water

The ink composition in the invention contains water, but the amount of water is not particularly limited. In particular, in terms of securing stability and ejection reliability, the amount of water is preferably from 10% by mass to 99% by mass, more preferably from 30% by mass to 80% by mass, and still more preferably from 50% by mass to 70% by mass, relative to the total mass of the ink composition.

Surfactant

The ink composition according to the invention may contain a surfactant, if necessary. The surfactant may be used as a surface tension adjusting agent.

As the surface tension adjusting agent, a compound having a structure in which a hydrophilic moiety and a hydrophobic moiety are contained in the molecule may be effectively used, and any of anionic surfactants, cationic surfactants, amphoteric surfactants, nonionic surfactants, and betaine surfactants may be used. Further, the dispersants (polymeric dispersant) as described above may be used as surfactants.

When the ink composition contains a surfactant, it is preferable that the surfactant be contained in such an amount that the surface tension of the ink composition may be adjusted to be within a range of from 20 mN/m to 60 mN/m, in view of performing the ejection of the ink composition satisfactorily by an ink jet method, and more preferably the surfactant is contained in such an amount that the surface tension of the ink composition may be adjusted to be within a range of from 20 mN/m to 45 mN/m, and even more preferably within a range of from 25 mN/m to 40 mN/m.

The specific amount of the surfactant in the ink composition is not particularly limited, and may be an amount by which a surface tension may be in the preferable range. The amount of the surfactant(s) is preferably 1% by mass or more, more preferably from 1% by mass to 10% by mass, and even more preferably from 1% by mass to 3% by mass.

Other Components

The ink composition may further contain various additives as other components according to necessity, in addition to the components described above.

Examples of the various additives include those known additives such as an ultraviolet absorbent, a fading preventing agent, an anti-mold agent, a pH adjusting agent, an anti-rust agent, an antioxidant, an emulsion stabilizer, a preservative, an antifoaming agent, a viscosity adjusting agent, a dispersion stabilizer, and a chelating agent.

Properties of Ink Composition

The surface tension (25° C.) of the ink composition according to the invention is preferably from 20 mN/m to 60 mN/m. More preferably, the surface tension is from 20 mN/m to 45 mN/m, and even more preferably from 25 mN/m to 40 mN/m.

The surface tension of the ink composition is measured under the conditions of a temperature of 25° C. using an automatic surface tensiometer (model name: CBVP-Z, manufactured by Kyowa Interface Science Co., Ltd.).

The viscosity at 25° C. of the ink composition according to the invention is preferably from 1.2 mPa·s to 15.0 mPa·s, more preferably from 2 mPa·s to less than 13 mPa·s, and even more preferably from 2.5 mPa·s to less than 10 mPa·s.

The viscosity of the ink composition is measured under the conditions of a temperature of 25° C. using a viscometer (model name: TV-22, manufactured by Toki Sangyo Co., Ltd.).

The ink composition of the invention is used as an ink-jet ink, and can be used for recording color images. For example, when full color images are formed, it is preferable to use the ink composition as a magenta color tone ink, a cyan color tone ink, and a yellow color tone ink. In order to adjust the color tone, the ink composition may be used as a black color tone ink. Moreover, besides the yellow, magenta, and cyan color tone inks, the ink composition, for example, can be use as red, green, blue, white inks or so-called special color inks in printing field.

Next, an ink jet recording method of the invention will be described.

The ink jet recording method of the invention at least includes recording an image on a recording medium by ejecting the ink jet recording ink composition of the invention as described above by an ink jet method (hereinafter sometimes referred to as an "image recording step") and thermally fixing the recorded image (hereinafter sometimes referred to as a "thermal fixing step"), and can further include, as required, additional step(s), for example, supplying a treatment liquid (a treatment liquid supplying step).

In the ink jet recording method of the invention, recording is performed using the ink composition of the invention as described above. Therefore, even when, for example, a recording system capable of high speed recording by, for example, a single pass method, is used, so that treatment, such as drying or fixing after ejecting, is performed in a short time, the occurrence of blocking in which, when a recording medium is further disposed on recorded images, image portions transfer to the rear side of the recording medium, or offset in which, when a member, such as a roller, is brought into contact with the images after recording to fix the images by thermally fixing or the like, the images transfer to the roller or the like to cause roller stain or image defects, may be suppressed.

—Image Recording Step—

In the image recording step, the ink composition for ink-jet recording of the present invention is ejected by an ink-jet method to record an image on a recording medium.

Image recording by utilizing the ink-jet method can be performed by supplying energy thereby ejecting an ink composition to a coated paper on which a treatment liquid has been supplied. Accordingly a colored image can be formed. In the ink-jet recording method of the present invention, for example, a method described in paragraphs 0093 to 0105 in JP-A No. 2003-306623 may be used as a preferable method.

The ink-jet method is not particularly limited and may be of any known system, for example, a charge control system of ejecting an ink by utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink by utilizing a radiation pressure, and a thermal ink-jet system of heating an ink to form bubbles and utilizing the resultant pressure. As the ink-jet method, an ink-jet method described in JP-A No. 54-59936 of causing abrupt volume change to an ink that undergoes the effect of thermal energy, and ejecting the ink from a nozzle by an operation force due to the change of state can be utilized effectively.

Examples of the ink-jet method include a system of injecting a number of ink droplets of low density, a so-called "photo-ink" each in a small volume, a system of improving an image quality by using plural kinds of inks of a substantially identical hue and of different densities, and a system of using a colorless transparent ink.

In the image recording step, for example, a recording medium conveying speed may be varied. The recording medium conveying speed is not specifically limited as long as the image quality is not impaired. The recording medium conveying speed is preferably, from 100 mm/s to 3000 mm/s, more preferably, from 150 mm/s to 2700 mm/s, and still more preferably from 250 mm/s to 2500 mm/s.

The recording medium is not particularly restricted. As a recording medium, for example, a coated paper, which is used in general offset printing or the like, may be used. The coated paper is a product obtained by applying a coating material on the surface of a high quality paper, a neutral paper or the like, which is mainly made of cellulose and is generally not surface-treated, to provide a coating layer.

In general, conventional image formation involving aqueous ink-jet ink using a coated paper as a recording medium may cause problems in the product quality, such as bleeding of image or scratch resistance, but in the ink-jet recording method of the invention, the image bleeding may be suppressed, and the generation of density unevenness may be prevented so that images with density uniformity can be formed, and images having favorable blocking resistance, offset resistance and scratch resistance may be recorded.

As the coated paper, those which are commercially available may be used. For example, a coated paper for general printing may be used, and specific examples thereof include coat papers (A2, B2) such as "OK TOPCOAT+" manufactured by Oji Paper Co., Ltd., "AURORACOAT" and "U-LITE" manufactured by Japan Paper Group, Inc.; and art paper (A1) such as "TOKUBISHI ART" manufactured by Mitsubishi Paper Mills, Ltd.

—Thermal Fixing Step—

In the thermal fixing step, the images recorded in the image recording step are fixed by thermal fixing. The fixing of images can be performed by pressing a pressing member against the inks constituting image portions on a recording medium. In the invention, the image fixation can be rapidly performed while an offset phenomenon can be suppressed in which images (ink composition) transfer to the pressing member thereby deteriorating the images when the pressing member is brought into contact with the images, and imaging quality can be maintained. Thus, images having favorable texture, such as glossiness of images, favorable scratch resistance (for example, adhesiveness with paper), and excellent imaging quality can be recorded at a high speed.

The fixing of image portions may be performed as follows. For example, after the image recording step, a pressure application member that applies pressure at least to the images may be pressed against the image portions to fix the image portions by application of pressure, thereby fixing the image portion (pressure application step). Alternatively, after the image recording step, using a heating member in combination with the pressure application member, the image portions may be fixed by application of pressure and heat (heating and pressure application step). Examples of the pressure application member include a pair of rolls that are pressed against each other and a pressure plate. Examples of the heating member include a heating roller and a heating plate. Specifically, for example, after the image recording step, the surface of the recording medium may be pressed using a heating roller which has been heated or a heating plate. In this case, the resin particles contained in the inks can be melted. The heating temperature in this case is preferably higher than Tg of the resin particles in the ink composition.

Treatment Liquid Supplying Step

The ink-jet recording method of the present invention preferably further includes supplying a treatment liquid with which an aggregate can be formed when the treatment liquid is in contact with the ink composition (treatment liquid supplying step), from the viewpoints of blocking resistance, scratch resistance and offset resistance of the images.

In the treatment liquid supplying step, the treatment liquid containing an aggregating agent for aggregating the components in the ink composition is supplied. When the ink-jet recording using the ink composition is performed in the presence of the treatment liquid, the occurrence of curling and cockling of the medium after recording may be suppressed, ink cissing may also be suppressed, and images having favorable blocking resistance, offset resistance and scratch resistance may be recorded.

Treatment Liquid

The treatment liquid includes at least one aggregating agent. When the aggregating agent comes into contact with the ink composition, an aggregate can be formed. The aggregating agent may be appropriately selected from the known compounds which are capable of causing aggregating, without particular limitation.

Examples of the aggregating agent include compounds capable of changing the pH of the ink composition, polyvalent metal salts, and cationic compounds. In the invention, compounds capable of changing the pH of the ink composition are preferable from the viewpoint of aggregation properties of the ink composition, and compounds capable of reducing the pH of the ink composition are more preferable.

Examples of the compounds capable of reducing the pH of the ink composition include acidic substances.

Examples of the acidic substances include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furancarboxylic acid, pyridinecarboxylic acid, coumarinic acid, thiophene carboxylic acid, nicotinic acid, derivatives of the compounds, and salts thereof.

In particular, acidic substances having high water-solubility are preferable. From the viewpoint of fixing the whole ink upon reacting with the ink composition, acidic substances having three or lower valences are preferable and acidic substances having two to three valences are more preferable.

One kind of the acidic substances may be used singly or two or more kinds of the acidic substances may be used in combination.

When the treatment liquid in the invention contains the acidic substances, the pH (25° C.) of the treatment liquid is preferably from 0.1 to 6.0, more preferably from 0.5 to 5.0, and still more preferably from 0.8 to 4.0.

Examples of the polyvalent metal salt include salts of any of alkaline earth metals belonging to Group II of the periodic table (e.g., magnesium and calcium), transition metals belonging to Group III of the periodic table (e.g., lanthanum), cations from Group XIII of the periodic table (e.g., aluminum), and lanthanides (e.g., neodymium). As salts of the metals, carboxylic acid salt (formate, acetate, benzoate, etc.), nitrate, chlorides, and thiocyanate are preferable. In particular, calcium salts or magnesium salts of carboxylic acids (e.g., formate, acetate, and benzoate), calcium salts or magnesium salts of nitric acid, calcium chloride, magnesium chloride, and calcium salts or magnesium salts of thiocyanic acid are preferable.

The cationic compound may be, for example, preferably a cationic surfactant. Preferred examples of the cationic surfactant include compounds of primary, secondary or tertiary amine salt type. Examples of these amine salt type compounds include compounds such as hydrochlorides or acetates (for example, laurylamine, palmitylamine, stearylamine, rosin amine), quaternary ammonium salt type compounds (for example, lauryltrimethylammonium chloride, cetyltrimethylammonium chloride, lauryldimethylbenzylammonium chloride, benzyltributylammonium chloride, benzalkonium chloride), pyridinium salt type compounds (for example, cetylpyridinium chloride, cetylpyridinium bromide), imidazoline type cationic compounds (for example, 2-heptadecenylhydroxyethylimidazoline), and ethylene oxide adducts of higher alkylamines (for example, dihydroxyethylstearylamine). A polyallylamine compound may be used. Further, amphoteric surfactants exhibiting cationic properties in a desired pH region may also be used, examples of which include amino acid type amphoteric surfactants, R—NH—CH$_2$CH$_2$—COOH type compounds wherein R represents an alkyl group or the like, carboxylic acid salt type amphoteric surfactants (for example, stearyldimethylbetaine, lauryldihydroxyethylbetaine), amphoteric surfactants of sulfuric acid ester type, sulfonic acid type or phosphoric acid ester type.

One kind of aggregating agent may be used singly or two or more kinds of aggregating agents may be used in combination.

The content of the aggregating agent(s) for aggregating components of the ink composition in the treatment liquid is preferably from 1 to 50% by mass, more preferably from 3 to 45% by mass, and even more preferably from 5 to 40% by mass.

When at least one of an acidic substance and a cationic compound is used in combination with the polyvalent metal compound, the content of the acidic substance and the cationic compound in the treatment liquid (total content of the acidic substance and the cationic compound) is preferably from 5% by mass to 95% by mass, and more preferably from 20% by mass to 80% by mass, relative to the total content of the polyvalent metal compound.

The treatment liquid according to the present invention may contain, in general, a water-soluble organic solvent in addition to the aggregating agent, and may also contain various other additives. Details of the water-soluble organic solvent and the various other additives are similar to those for the ink composition.

The surface tension (25° C.) of the treatment liquid is preferably 20 mN/m or more and 60 mN/m or less. More preferably, the surface tension is 25 mN/m or more and 50 mN/m or less, and is even more preferably 25 mN/m or more and 45 mN/m or less.

The surface tension of the treatment liquid is measured under the conditions of a temperature of 25° C. using an automatic surface tension meter (model name: CBVP-Z, manufactured by Kyowa Interface Science Co., Ltd.).

In regard to the supplying of the treatment liquid on coated paper, known liquid supplying methods may be used without any particular limitation, and any method may be selected. Examples of the method include spray coating, coating with a coating roller, supplying by an ink-jet method, and dipping.

Specific examples of a liquid supplying method include size press methods represented by a horizontal size press method, a roll coater method, a calender size press method or the like; size press methods represented by an air knife coater method or the like; knife coater methods represented by an air knife coater method; roll coater methods represented by a transfer roll coater method such as a gate roll coater method, a direct roll coater method, a reverse roll coater method, a squeeze roll coater method or the like; blade coater methods represented by a billblade coater method, a short dwell coater method, a two stream coater method; bar coater methods represented by a rod bar coater method; bar coater methods represented by a rod bar coater method; cast coater methods; gravure coater method; curtain coater methods; die coater methods; brush coater methods; and transfer methods.

Furthermore, a method of coating in which the coating amount is controlled using a coating apparatus equipped with a liquid amount controlling member, as in the case of the coating apparatus described in JP-A No. 10-230201, may be used.

The treatment liquid may be supplied over the entire surface of the recording medium (coated paper). Alternatively, the treatment liquid may be supplied to a region where ink-jet recording is performed in the subsequent image recording step. According to the invention, in view of uniformly adjusting the amount of supplying of the treatment liquid, uniformly recording fine lines, fine image portions or the like, and suppressing image unevenness such as density unevenness, it is preferable that the treatment liquid is supplied over the entire surface of the coated paper by coating the liquid using a coating roller or the like.

As for the method of coating the treatment liquid while controlling the amount of supply of the aggregating agent to the above-described range, for example, a method of using an anilox roller may be suitably mentioned. The anilox roller is a roller in which the roller surface, being thermal spray coated with ceramics, is processed with laser and provided with a pattern of a pyramidal shape, a slant-lined shape, a hexagonal shape or the like on the surface. The treatment liquid goes into the depression areas provided on this roller surface, and when the roller surface contacts the paper surface, transfer occurs, and the treatment liquid is coated in an amount that is controlled at the depressions of the anilox roller.

EXAMPLES

Hereinafter, the invention will be more specifically described according to Examples, but the invention is not limited to the following Examples insofar as the gist thereof is not exceeded. Unless otherwise specified, "part" and "parts" are all based on mass.

The weight average molecular weight was measured by gel permeation chromatography (GPC), and was calculated in terms of polystyrene. The GPC was performed with HLC-8020GPC (trade name, manufactured by Tosoh Corporation) using, as a column, TSKgel SuperHZM-H, TSKgel SuperHZ4000, and TSKgel SuperHZ200 (trade names, manufactured by Tosoh Corporation) and using THF (tetrahydrofuran) as an eluate.

—Synthesis of Polymer Dispersant P-1—

To a 1000 ml three necked flask having a stirrer and a condenser pipe, 88 g of methyl ethyl ketone was added, and then the flask was heated to 72° C. under a nitrogen atmosphere. In the flask, a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was added dropwise over 3 hours. After the completion of dropwise addition, the content in the flask was further allowed for reaction for one hour. Thereafter, a solution in which 0.42 g of dimethyl-2,2'-azobisisobutyrate dissolved in 2 g of methyl ethyl ketone was added to thereto, and the temperature of the resultant mixture was raised to 78° C. and maintained at 78° C. for 4 hours while heating. The obtained reacted solution was re-precipitated twice in a large excess amount of hexane, and the precipitated resin was dried, thereby obtaining 96 g of polymer dispersant P-1.

The composition of the obtained resin was confirmed by $^1$H-NMR and the weight average molecular weight (Mw) determined by GPC was 44,600. The acid value determined by a method specified in JIS (JIS K0070:1992), the disclosure of which is incorporated by reference, was 65.2 mgKOH/g.

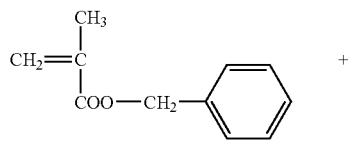

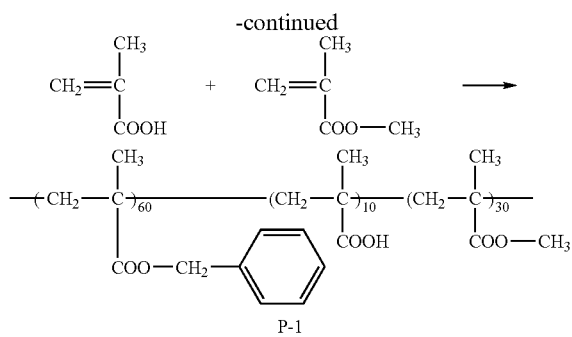

P-1

—Preparation of Resin-Coated Pigment Dispersion—

(1) Resin-Coated Cyan Pigment Dispersion 10 parts of pigment blue 15:3 (phthalocyanine blue A220, manufactured by Dainichiseika Color & Chemicals Mfg. Co., Ltd), 5 parts of the polymer dispersant P-1, 42 parts of methyl ethyl ketone, 5.5 parts of 1 mol/L aqueous NaOH solution, and 87.2 parts of ion exchange water were mixed, and dispersed using 0.1 mm$\phi$ zirconia beads in a bead mill for 2 to 6 hours. From the obtained dispersion, methyl ethyl ketone was removed at 55° C. under a reduced pressure and some water was further removed, thereby obtaining a resin-coated cyan pigment dispersion (encapsulated pigment) having a pigment concentration of 10.2% by mass.

(2) Resin-Coated Magenta Pigment Dispersion

A resin-coated magenta pigment dispersion was obtained in the same manner as in the resin-coated cyan pigment dispersion, except that in place of pigment blue 15:3, CHROMOPHTHAL JET MAGENTA DMQ (trade name, manufactured by Ciba Specialty Chemicals, pigment red 122) was used as the pigment in the preparation of the resin-coated cyan pigment dispersion.

(3) Resin-Coated Yellow Pigment Dispersion

A resin-coated yellow pigment dispersion was obtained in the same manner as in the resin-coated cyan pigment dispersion, except that in place of pigment blue 15:3, IRGALITE YELLOW GS (trade name, manufactured by Ciba Specialty Chemicals, pigment yellow 74) was used as the pigment in the preparation of the resin-coated cyan pigment dispersion.

—Preparation of Resin Particles—

Synthesis of Self-dispersing Polymer B-1

In a 2 L three necked flask having a stirrer, a thermometer, a reflux condenser tube, and a nitrogen gas introducing pipe, 540.0 g of methyl ethyl ketone was charged, and the temperature was increased to 75° C. While maintaining the temperature in the reactor at 75° C., a mixed solution containing 108 g of methyl methacrylate, 388.8 g of isobornyl methacrylate, 43.2 g of methacrylic acid, 108 g of methyl ethyl ketone, and 2.16 g of "V-601" (trade name, manufactured by Wako Pure Chemical Inc., Ltd.) was added dropwise to the reactor at a constant speed so that the dropwise addition was completed in 2 hours. After the completion of the dropwise addition, a solution containing 1.08 g of "V-601" and 15.0 g of methyl ethyl ketone was added, and the resulting mixture was stirred at 75° C. for 2 hours. Thereafter, a solution containing 0.54 g of "V-601" and 15.0 g of methyl ethyl ketone was further added, and the resulting mixture was stirred at 75° C. for 2 hours. Thereafter, the temperature was increased to 85° C., and the mixture was continuously stirred for further 2 hours, thereby obtaining a resin solution of methyl methacrylate/ isobornyl methacrylate/methacrylic acid (=20/72/8 [mass ratio]) copolymer.

The weight average molecular weight (Mw) of the obtained copolymer was 61,000 and the acid value thereof was 52.1 mgKOH/g.

Next, 588.2 g of the resin solution was weighed, 165 g of isopropanol and 120.8 ml of 1 mol/L aqueous NaOH solution were added, and the temperature in the reactor was increased to 80° C. Next, 718 g of distilled water was added dropwise at a rate of 20 ml/min for water dispersing. Thereafter, the content in the reactor was held under atmospheric pressure while maintaining the temperature in the reactor at 80° C. for 2 hours, at 85° C. for 2 hours, and then at 90° C. for 2 hours, and the solvent was distilled off. Further, the pressure in the reactor was reduced, and isopropanol, methyl ethyl ketone, and distilled water were distilled off, thereby obtaining an aqueous dispersion of self-dispersing polymer B-1 (resin particles) having a solid content concentration of 26.0% by mass.

The glass transition temperature of the self-dispersing polymer B-1 was measured by the following method, and the glass transition temperature was 180° C. in terms of measured Tg.

Measured Tg

The aqueous dispersion of 0.5 g of the self-dispersing polymer B-1 in terms of solid content was dried under a reduced pressure at 50° C. for 4 hours, thereby obtaining a polymer solid. Tg was measured using the obtained polymer solid by a differential scanning calorimeter (DSC) EXSTAR6220 (trade name) manufactured by SII Nanotechnology, Inc. The measurement conditions were as follows: 5 mg of a sample was sealed in an aluminum pan, and the value of the peak top of DDSC of the measurement data during a second increase in temperature in the following temperature profiles under a nitrogen atmosphere was defined as Tg.

30° C.→−50° C. (cooling at 50° C./minute)
−50° C.→>120° C. (temperature increasing at 20° C./minute)
120° C.→−50° C. (cooling at 50° C./minute)
−50° C.→120° C. (temperature increasing at 20° C./minute)

Synthesis of Self-Dispersing Polymers B-2 to B-5

Aqueous dispersions of self-dispersing polymers (resin particles) B-2 to B-5 having the following monomer composition were prepared in the same manner as above, except that the type and proportion of the monomers in the preparation of the aqueous dispersion of the self-dispersing polymer B-1 were changed respectively. The measured Tg was determined in the same manner as above.

B-2: Methyl methacrylate/dicyclopentanyl methacrylate/ methacrylic acid (=40/50/10, measured Tg=130° C.)

B-3: Methyl methacrylate/dicyclopentanyl methacrylate/ methoxypolyethylene glycol methacrylate (n=2)/methacrylic acid (54/35/5/6, measured Tg=100° C.)

B-4: n-butyl methacrylate/cyclohexyl methacrylate/styrene/acrylic acid copolymer (30/55/10/5, measured Tg=86° C.)

B-5: Phenoxy ethyl acrylate/methyl methacrylate/acrylic acid copolymer (20/70/10, measured Tg=71° C.)

—Preparation of Ink—

Using the resin-coated pigment dispersions and the aqueous dispersions of self-dispersing polymer particles B-1 to B-5 obtained above, each of cyan color inks 1 to 6, magenta color inks 7 and 8, yellow color ink 9, black color ink 10, and comparative cyan inks 11 to 15 having the composition as shown in Table 1 was prepared. Here, the total solid content of each ink, the solid content proportion of the resin particles, Tg, and the amount of organic solvents are shown in Table 1.

—Preparation of Treatment Liquid—

Components of the following formula were mixed, thereby preparing treatment liquid 1. The pH (25° C.) of treatment liquid 1 was 1.21 when measured by a pH meter WM-50EG (trade name) manufactured by TOA ELECTRIC INDUSTRIAL CO., LTD. Formula

| | |
|---|---|
| Malonic acid (aggregating agent) | 7.5 g |
| SANNIX GP250 (SP value: 26.4) | 10 g (trade name, manufactured by Sanyo Chemical Industries, Ltd., polypropylene glycol glyceryl ether) |
| Ion exchange water | 7.5 g |

—Image Recording—

TOKUBISHI art (basis weight of 104.7 g/m$^2$) was prepared as a recording medium (coated paper) and a recording apparatus having the structure illustrated in FIG. 1 was prepared as an ink-jet recording apparatus. The recording apparatus was started up, the recording medium was fixed on a hard rubber belt thereof, and the recording medium was conveyed at a conveying speed of 400 mm/sec, and images were recorded through the following steps. <I> to <V> in FIG. 1 correspond to the following steps I to V, respectively. Thereafter, the obtained recorded images were evaluated as described below. The results are shown in Table 1.

I. Treatment Liquid Supplying Step

First, the treatment liquid 1 was applied over the entire surface of the recording medium using a roll coater which has an anilox roller 11 (number of lines of 100 to 300/inch) and the coating amount of which was controlled, so that the amount of supply was 1.2 g/m$^2$.

II. Treatment Step

Subsequently, the recording medium onto which treatment liquid 1 was applied was heated with a contact type plate heater 22 from the rear side (opposite to the recording surface) of the recording medium under the following conditions and the air was blown by a drying fan 21, thereby performing a drying treatment and penetration treatment.

Air speed: 10 m/s

Temperature: The recording medium was heated such that the surface temperature on the recorded surface side of the recording medium became 60° C.

III. Image Recording Step

Two GELJET GX5000 printer heads (trade name, full line head manufactured by Ricoh Co., Ltd.) were arranged and fixed so that the direction of the line head (main scanning direction) in which nozzles are disposed inclined at 75.7° relative to the direction orthogonal to the running direction (sub-scanning direction) of an endless hard rubber belt as illustrated in FIG. 1. In a first ink jet head 31 and a second ink jet head 32, the cyan, magenta, yellow, and black inks and the comparative cyan ink obtained above were charged. Then, the position of each of the first ink jet head and the second ink jet head was adjusted so that the ink droplets ejected from each of the heads were overlapped. Thereafter, each ink was ejected by an ink jet method under the following conditions to the coated surface of the recording medium coated with treatment liquid 1, and solid images were recorded.

Conditions

Amount of ejected ink droplet: 2.4 pL

Resolution: 1200 dpi×1200 dpi

IV. Ink Drying Step

Subsequently, the recording medium was conveyed by a belt to a dry region, and then the recording medium to which the ink droplets were applied was dried under the following conditions by blowing air with a drying fan 41 while being heated with a contact type plate heater from the rear side (opposite side of the recorded surface) of the recording medium. Here, the moisture content in the recording medium on which images were recorded was determined immediately after the drying step, and the moisture content quantitatively determined by Karl Fischer coulometric titration (CA-200 (trade name, manufactured by Mitsubishi Chemical Analytech, Co., Ltd.) was from about 2.0 g/m$^2$ to about 3.0 g/m$^2$.

Conditions

Drying method: air blown drying

Air speed: 15 m/s

Temperature: The recording medium was heated so that the surface temperature on the recorded surface side of the recording medium became 60° C.

V. Fixing Step

Next, the recording medium was passed between a pair of rollers (a silicone rubber roller 51 and a large diameter drum 52) that were pressed against each other under the following conditions to thereby subjecting the images to thermal fixing treatment, and then disposed in a collection tray (not illustrated) and collected as it was. To the surface of the silicone rubber roller 51, silicone oil was thinly applied for preventing adhesion.

Conditions

Silicone rubber roller 51: Hardness of 50°, Nip width of 5 mm

Roller temperature: 70° C.

Surface temperature of drum 52: 60° C.

Pressure: 0.2 MPa

—Evaluation—

Offset Resistance

A solid image was formed by disposing the solid image formed by the inks ejected from the second ink jet head 32 on the solid image formed by the inks ejected from the first ink jet head 31. Then, stain of each of the image surface and the silicone rubber roller was visually observed, and was evaluated in accordance with the following evaluation criteria.

Evaluation Criteria

A: No offset is observed.

B: A slight offset is observed partly. Practically nonproblematic level.

C: Offset occurs. Minimum tolerable level for practical application.

D: Occurrence of offset is significant. Very low level with respect to practical application.

Blocking Resistance

Immediately after recording a solid image using the first ink jet head 31, an unrecorded recording medium (the same recording medium as that used for recording (hereinafter, referred to as an unused sample in regard to the current evaluation)) was placed on the solid image, and was left for 6 hours under conditions of a temperature of 60° C. and a humidity of 30% RH with a load of 350 kg/m$^2$. The degree of transfer of ink to the blank area of the unused sample was visually observed, and was evaluated according to the following evaluation criteria.

Evaluation Criteria

A: There is no transfer of ink at all.

B: Transfer of ink is hardly noticeable.

C: Some level of transfer of ink is observed. Minimum tolerable level for practical application.

D: Transfer of ink is significant.

Scratch Resistance

A recording medium to which a solid image was recorded using the first ink jet head 31 was left to stand for 24 hours under conditions of a temperature of 25° C. and a humidity of 60% RH. Thereafter, an unrecorded recording medium (the same recording medium as that used for recording (hereinafter, referred to as an unused sample in regard to the current evaluation)) was placed on the solid image, and was rubbed thereagainst reciprocatingly (back and forth) 10 times with a load of 150 kg/m$^2$. The degree of transfer of ink to the blank area of the unused sample was visually observed, and was evaluated according to the following evaluation criteria.

Evaluation Criteria
A: There is no transfer of ink at all.
B: Transfer of ink is hardly noticeable.
C: Some level of transfer of ink is observed.
D: Transfer of ink is significant.

TABLE 1

| | | Examples | | | | | | | | | |
|---|---|---|---|---|---|---|---|---|---|---|---|
| | | Ink 1 Cyan | Ink 2 Cyan | Ink 3 Cyan | Ink 4 Cyan | Ink 5 Cyan | Ink 6 Cyan | Ink 7 Magenta | Ink 8 Magenta | Ink 9 Yellow | Ink 10 Black |
| | Pigment | 3.0 | 2.5 | 2.5 | 2.5 | 2.5 | 3.0 | 5.0 | 5.0 | 4.0 | 4.0 |
| | Dispersant | 1.5 | 1.3 | 1.3 | 1.3 | 1.3 | 1.5 | 1.5 | 1.5 | 2.0 | 0.8 |
| Solvent | GP250 (Sp value: 26.4) | 8.0 | 6.0 | 8.0 | 8.0 | 10.0 | 3.5 | 8.0 | 8.0 | 8.0 | 10.0 |
| | TPGmME (Sp value: 20.4) | 8.0 | 6.0 | 8.0 | 8.0 | 10.0 | 8.0 | 8.0 | 8.0 | 8.0 | 6.0 |
| | Glycerol (Sp value: 33.5) | — | — | — | — | — | 4.5 | — | — | — | — |
| | DEG (Sp value: 30.6) | — | — | — | — | — | — | — | — | — | — |
| | Self-dispersing polymer | B-1 | B-2 | B-3 | B-4 | B-1 | B-1 | B-1 | B-1 | B-1 | B-1 |
| | Resin particles | 6.3 | 8.0 | 8.0 | 8.0 | 8.0 | 6.3 | 8.0 | 4.0 | 7.0 | 4.2 |
| | Surfactant | 1.0 | 1.0 | 1.0 | 1.0 | 1.0 | 1.0 | 1.0 | 1.0 | 1.0 | 1.0 |
| | Thickening agent (PE108) | 0.3 | 0.6 | 0.3 | 0.3 | 0.3 | 0.6 | — | — | 0.2 | 0.3 |
| | Water | 71.7 | 74.7 | 74.7 | 70.7 | 66.7 | 71.7 | 68.3 | 72.3 | 69.7 | 72.7 |
| | Total | 100 | 100 | 100 | 100 | 100 | 100 | 100 | 100 | 100 | 100 |

| | | Comparative Examples | | | | |
|---|---|---|---|---|---|---|
| | | Ink 11 Cyan | Ink 12 Cyan | Ink 13 Cyan | Ink 14 Cyan | Ink 15 Cyan |
| | Pigment | 2.5 | 3.0 | 3.0 | 3.0 | 3.0 |
| | Dispersant | 1.3 | 1.5 | 1.5 | 1.5 | 1.5 |
| Solvent | GP250 (Sp value: 26.4) | 8.0 | — | 8.0 | 2.5 | 8.0 |
| | TPGmME (Sp value: 20.4) | 8.0 | 8.0 | 8.0 | 8.0 | — |
| | Glycerol (Sp value: 33.5) | — | 8.0 | — | 5.5 | — |
| | DEG (Sp value: 30.6) | — | — | — | — | 8.0 |
| | Self-dispersing polymer | B-1 | B-1 | B-5 | B-1 | B-1 |
| | Resin particles | 5.8 | 6.3 | 6.3 | 6.3 | 6.3 |
| | Surfactant | 1.0 | 1.0 | 1.0 | 1.0 | 1.0 |
| | Thickening agent (PE108) | 0.6 | 0.6 | 0.6 | 0.6 | 0.6 |
| | Water | 72.9 | 71.7 | 71.7 | 71.7 | 71.7 |
| | Total | 100 | 100 | 100 | 100 | 100 |

| | Examples | | | | | | | | | |
|---|---|---|---|---|---|---|---|---|---|---|
| | Ink 1 Cyan | Ink 2 Cyan | Ink 3 Cyan | Ink 4 Cyan | Ink 5 Cyan | Ink 6 Cyan | Ink 7 Magenta | Ink 8 Magenta | Ink 9 Yellow | Ink 10 Black |
| Total solid content (Pigment + Dispersant + Resin particles) | 10.8 | 11.8 | 11.8 | 11.8 | 11.8 | 10.8 | 14.5 | 10.5 | 13.0 | 10.0 |
| Proportion of resin particles in the total solid content | 58% | 68% | 68% | 68% | 68% | 58% | 55% | 38% | 54% | 42% |
| Tg of resin particles [° C.] | 180 | 130 | 100 | 86 | 180 | 180 | 180 | 180 | 180 | 180 |
| Solvent amount | 16 | 12 | 16 | 16 | 20 | 16 | 16 | 16 | 16 | 16 |

TABLE 1-continued

| | | Comparative Examples | | | | |
|---|---|---|---|---|---|---|
| | | Ink 11 Cyan | Ink 12 Cyan | Ink 13 Cyan | Ink 14 Cyan | Ink 15 Cyan |
| Total solid content (Pigment + Dispersant + Resin particles) | | 9.6 | 10.8 | 10.8 | 10.8 | 10.8 |
| Proportion of resin particles in the total solid content | | 61% | 58% | 58% | 58% | 58% |
| Tg of resin particles [° C.] | | 180 | 180 | 71 | 180 | 180 |
| Solvent amount | | 16 | 16 | 16 | 16 | 16 |

| | | Examples | | | | | | | | | |
|---|---|---|---|---|---|---|---|---|---|---|---|
| | | Ink 1 Cyan | Ink 2 Cyan | Ink 3 Cyan | Ink 4 Cyan | Ink 5 Cyan | Ink 6 Cyan | Ink 7 Magenta | Ink 8 Magenta | Ink 9 Yellow | Ink 10 Black |
| Evaluation | Fixation offset | A | A | A | B | A | B | A | B | A | A |
| | Blocking | A | A | B | B | B | A | A | A | A | A |
| | Scratch resistance | A | A | A | A | A | B | A | B | A | B |

| | | Comparative Examples | | | | |
|---|---|---|---|---|---|---|
| | | Ink 11 Cyan | Ink 12 Cyan | Ink 13 Cyan | Ink 14 Cyan | Ink 15 Cyan |
| Evaluation | Fixation offset | C | C | C | B | B |
| | Blocking | A | B | C | B | C |
| | Scratch resistance | A | C | A | C | C |

The details of the components in Table 1 (1-1 to 1-6) will be described below.

GP250: SANNIX GP250 (trade name, manufactured by Sanyo Chemical Industries, Ltd., polypropylene glycol glyceryl ether)

TPGmME: Tripropylene glycol monomethyl ether (manufactured by Wako Pure Chemical Ind., Ltd.)

DEG: Diethylene glycol (manufactured by Wako Pure Chemical Ind., Ltd.)

Glycerol (manufactured by Wako Pure Chemical Ind., Ltd.)

Surfactant: OLFINE E1010 (trade name, manufactured by Nissin Chemical Industry Co., Ltd.)

Thickening agent (PE108): NEWPOL PE108 (trade name, manufactured by Sanyo Chemical Industries, Ltd.)

As shown in Table 1, in the Examples, the occurrence of blocking and offset could be prevented and images having excellent scratch resistance could be obtained.

According to the present invention, it is possible to provide an ink jet recording ink composition the occurrence of blocking in the formed images can be suppressed, which has excellent offset resistance during recording and with which recorded images have excellent scratch resistance. Moreover, according to the present invention, it is possible to provide an ink jet recording method by which the occurrence of blocking in the formed images and offset during fixation can be prevented and high speed recording is enabled.

The present invention includes the following exemplary embodiments. However, the present invention is not limited to the following exemplary embodiments.

<1> An ink composition for ink-jet recording comprising:
a pigment;
resin particles having a glass transition temperature of 80° C. or higher;
at least one water-soluble organic solvent; and
water,
wherein a total mass of solid content in the ink composition for ink-jet recording is 10% by mass or more relative to the ink composition for ink-jet recording, and the at least one water-soluble organic solvent includes at least one organic solvent having an SP value of 27.5 or lower, the amount of the at least one organic solvent having an SP value of 27.5 or lower being 70% by mass or more relative to a total amount of the at least one water-soluble organic solvent.

<2> The ink composition for ink-jet recording of <1>, wherein the content of the resin particles in the ink composition for ink-jet recording is 40% by mass or more relative to the mass of the total solid content of the ink composition for ink-jet recording.

<3> The ink composition for ink-jet recording of <1> or <2>, wherein the content of the resin particles in the ink composition for ink-jet recording is from 40% by mass to 80% by mass relative to the mass of the total solid content of the ink composition.

<4> The ink composition for ink-jet recording of any one of <1> to <3>, wherein the total amount of the one or more water-soluble organic solvents is less than 20% by mass relative to the total mass of the ink composition for ink-jet recording.

<5> The ink composition for ink-jet recording of any one of <1> to <4>, wherein the resin particles are self-dispersing resin particles.

<6> The ink composition for ink-jet recording of any one of <1> to <5>, wherein the one or more water-soluble organic solvents include an alkylene oxide adduct of glycerol represented by the following Formula (1) and an alkylene glycol alkyl ether having an SP value of 23 or lower:

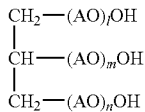

Formula (I)

wherein, in Formula (1), l, m and n are each independently an integer of 1 or more, and the sum of l, m and n is from 3 to 15; AO represents at least one selected from the group consisting of an ethyleneoxy group and a propyleneoxy group; and AO of $(AO)_l$, $(AO)_m$, and $(AO)_n$ may respectively be the same as or different from each other.

<7> The ink composition for ink-jet recording of <6>, wherein the alkylene glycol alkyl ether is a dialkylene glycol monoalkyl ether or a trialkylene glycol monoalkyl ether.

<8> The ink composition for ink-jet recording of <6> or <7>, wherein the mass ratio of the amount of the alkylene oxide adduct of glycerol represented by Formula (1) to that of the alkylene glycol alkyl ether having an SP value of 23 or lower is from 1:5 to 5:1.

<9> The ink composition for ink-jet recording of any one of <1> to <8>, wherein the glass transition temperature of the resin particles is from 100° C. to 300° C.

<10> An ink-jet recording method comprising at least:
ejecting the ink composition for ink-jet recording of any one of <1> to <9> to record an image on a recording medium; and
thermally fixing the recorded image.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition for ink-jet recording comprising:
a pigment;
resin particles having a glass transition temperature of 80° C. or higher;
at least one water-soluble organic solvent; and
water,
wherein a total mass of solid content in the ink composition for ink-jet recording is 10% by mass or more relative to the ink composition for ink-jet recording, and the at least one water-soluble organic solvent includes at least one organic solvent having an SP value of 27.5 or lower, the amount of the at least one organic solvent having an SP value of 27.5 or lower being 70% by mass or more relative to a total amount of the at least one water-soluble organic solvent.

2. The ink composition for ink-jet recording of claim 1, wherein a content of the resin particles in the ink composition for ink-jet recording is 40% by mass or more relative to the total mass of the solid content in the ink composition for ink-jet recording.

3. The ink composition for ink-jet recording of claim 1, wherein a content of the resin particles in the ink composition for ink-jet recording is from 40% by mass to 80% by mass relative to the total mass of the solid content in the ink composition for ink-jet recording.

4. The ink composition for ink-jet recording of claim 1, wherein a total amount of the at least one water-soluble organic solvent is less than 20% by mass relative to a total mass of the ink composition for ink-jet recording.

5. The ink composition for ink-jet recording of claim 1, wherein the resin particles are self-dispersing resin particles.

6. The ink composition for ink-jet recording of claim 1, wherein the at least one water-soluble organic solvent includes an alkylene oxide adduct of glycerol represented by the following Formula (1), and an alkylene glycol alkyl ether having an SP value of 23 or lower:

Formula (I)

wherein, in Formula (1), l, m and n are each independently an integer of 1 or more, and the sum of l, m and n is from 3 to 15; AO represents at least one selected from the group consisting of an ethyleneoxy group and a propyleneoxy group; and the AO groups in $(AO)_l$, $(AO)_m$, and $(AO)_n$ are the same as, or different from, each other.

7. The ink composition for ink-jet recording of claim 6, wherein the alkylene glycol alkyl ether is a dialkylene glycol monoalkyl ether or a trialkylene glycol monoalkyl ether.

8. The ink composition for ink-jet recording of claim 6, wherein the mass ratio of the amount of the alkylene oxide adduct of glycerol represented by Formula (1) to that of the alkylene glycol alkyl ether having an SP value of 23 or lower, is from 1:5 to 5:1.

9. The ink composition for ink-jet recording of claim 1, wherein the glass transition temperature of the resin particles is from 100° C. to 300° C.

10. An ink-jet recording method comprising:
ejecting the ink composition for ink-jet recording of claim 1 to record an image on a recording medium; and
thermally fixing the recorded image.

* * * * *